US012326034B2

(12) United States Patent
Suggs et al.

(10) Patent No.: US 12,326,034 B2
(45) Date of Patent: Jun. 10, 2025

(54) SAFE LOCKING MECHANISMS AND RELATED APPARATUS

(71) Applicant: Rhino Metals, Inc., Caldwell, ID (US)

(72) Inventors: Donald K. Suggs, Boise, ID (US); Paul R. Walters, Jr., Meridian, ID (US)

(73) Assignee: Rhino Metals, Inc., Caldwell, ID (US)

( * ) Notice: Subject to any disclaimer, the term of this patent is extended or adjusted under 35 U.S.C. 154(b) by 184 days.

(21) Appl. No.: 17/978,061

(22) Filed: Oct. 31, 2022

(65) Prior Publication Data

US 2023/0133473 A1 May 4, 2023

Related U.S. Application Data

(60) Provisional application No. 63/275,920, filed on Nov. 4, 2021.

(51) Int. Cl.

*E05G 1/04* (2006.01)
*E05B 55/00* (2006.01)
*E05B 65/00* (2006.01)
*E05G 1/026* (2006.01)

(52) U.S. Cl.

CPC ................ *E05G 1/04* (2013.01); *E05B 55/00* (2013.01); *E05B 65/0075* (2013.01); *E05G 1/026* (2013.01)

(58) Field of Classification Search

CPC .. E05G 1/02; E05G 1/026; E05G 1/04; E05B 55/00; E05B 65/0075
See application file for complete search history.

(56) References Cited

U.S. PATENT DOCUMENTS 1,136,254 A * 4/1915 Mosler et al. ...... E05B 65/0075 292/38
1,438,547 A 12/1922 O'Connor
4,500,122 A * 2/1985 Douglas ................ E05B 65/087 292/341.15

(Continued)

FOREIGN PATENT DOCUMENTS

CN 209723921 12/2019
CN 110670958 1/2020
GB 1406801 9/1975

OTHER PUBLICATIONS

"Treadlok Security Chest" [online]. Switzer's, 2023 [retrieved on Mar. 1, 2023]. Retrieved from the Internet: <http//bid.switzersauction.com/TREADLOK-SECURITY-CHEST_i31564017> (2 pgs).

(Continued)

*Primary Examiner* — Christopher J Boswell
(74) *Attorney, Agent, or Firm* — Matthew D. Thayne; Thayne and Davis LLC

(57) ABSTRACT

Safes and related locking assemblies, mechanisms, and enclosures. In some embodiments, the locking mechanism may comprise one or more fixed locking members, such as studs, mounted on or otherwise coupled to the body of the safe or other enclosure, such as a box, building, vehicle, trailer or the like. In some embodiments, the locking members may be mounted to the door/lid frame of the enclosure. Additional moveable locking members may be positioned on and/or moveably coupled with the safe door, which may allow the moveable locking members to engage the fixed locking members on the door frame to lock the door/lid in place.

24 Claims, 40 Drawing Sheets

(56) References Cited

U.S. PATENT DOCUMENTS

| | | | | | |
|---|---|---|---|---|---|
| 5,503,440 | A * | 4/1996 | Peccoux | E05C 9/026 292/DIG. 21 |
| 5,746,458 | A | 5/1998 | Fisher | |
| 6,561,604 | B2 * | 5/2003 | Leccia | E05C 19/006 292/26 |
| 6,871,602 | B2 | 3/2005 | McCracken et al. | |
| 6,883,440 | B1 | 4/2005 | Correia | |
| 6,935,662 | B1 | 8/2005 | Hauber et al. | |
| 7,353,637 | B2 * | 4/2008 | Harger | E05B 65/087 49/449 |
| 8,733,853 | B2 * | 5/2014 | Gingrich | H02B 13/025 312/216 |
| 8,939,474 | B2 | 1/2015 | Hagemeyer et al. | |
| 9,297,181 | B2 | 3/2016 | Gasparetto | |
| 9,540,843 | B2 | 1/2017 | Garrett | |
| 11,242,703 | B2 * | 2/2022 | Sims | E05C 9/063 |
| 2012/0169196 | A1 | 7/2012 | Marchetti | |

OTHER PUBLICATIONS

CN110670958, Hebei Ao Digui of Hu Pai Group Industry Co Ltd, Machine Translation (4 pgs).
CN2097239921, Ningbo Aipu Industrial Co Ltd, Machine Translation (3 pgs).

* cited by examiner

SAFE LOCKING MECHANISMS AND RELATED APPARATUS

RELATED APPLICATIONS

This application claims the benefit under 35 U.S.C. § 119(e) of U.S. Provisional Patent Application No. 63/275,920, which was filed Nov. 4, 2021, and titled "SAFES & RELATED LOCKING ENCLOSURES," which application is incorporated herein by reference in its entirety.

SUMMARY

Described herein are various locking mechanisms and related features and components that may be used, for example, in connection with safes, lockboxes, doors for homes or other buildings, vehicles, trailers, or other enclosures. In some embodiments, the locking mechanisms described herein may provide one or more benefits, such as providing less steel, fewer or, in some cases, no machined parts, fewer or no chromed parts, and/or less bodywork. The mechanisms described herein may also improve ease of manufacturing and/or security in other ways, such as providing for assembly/manufacturing in fewer steps, requiring less welding, less forming of parts, and/or less grinding. Safes and other locking enclosures manufactured using the teachings provided herein may also, or alternatively, be more easily made water resistant and/or waterproof due to the unique locking mechanisms and/or placement described herein. In addition, these teachings, features, and/or components may simplify making safes with more than a single color.

Other benefits may be provided in some embodiments disclosed herein, such as allowing for mounting of locking studs or other locking members/elements on the doorframe and/or body of the safe/enclosure rather than the door, which may increase security relative to, for example, door bolts, otherwise referred to as locking pins or locking bars, or any other locking element that extends and retracts from the side of the door to engage the door frame and/or body of the safe. In addition, some embodiments may allow for providing all movement of the moveable locking members/elements of the safe/enclosure within the door, in some cases without allowing for extending them beyond the perimeter of the door, which may further enhance security.

In addition, some embodiments may advantageously provide an inset region for positioning of the fixed locking members, which may allow the door/lid to be closed and secured without protruding beyond the frame. In some cases, the door may be aligned with the frame in the closed position with the door positioned within the inset region of the body of the safe or other enclosure, which may prevent or at least inhibit prying by ensuring that any prying forces will be directed orthogonal or otherwise at a substantial angle relative to the direction of force that would otherwise be most effectively used to open the door/lid.

In a more specific example of a safe according to some embodiments, the safe may comprise a body and a door coupled with the body. One or more protruding locking members, such as locking studs, may be fixedly coupled with and protruding from a portion of the body. In some embodiments, these locking members may be positioned internally of an outer frame of the body, such as within an inset frame region for the door. The safe may further comprise at least one actuation member moveably coupled with the door. The at least one actuation member may comprise a slot. The at least one actuation member may be configured to, upon actuation with the door in a closed configuration, selectively engage the at least one protruding locking member, and lock the door in the closed configuration.

In some embodiments, one or more openings may be fixedly coupled with the door. In some such embodiments, one or more of the at least one actuation member may be configured to, upon actuation with the door in a closed configuration, overlap with a respective opening to effectively decrease a size of the opening, selectively engage the at least one protruding locking member, and lock the door in the closed configuration.

In some embodiments, the at least one actuation member may be configured to avoid extending beyond a perimeter of the door in a locked configuration.

Some embodiments may further comprise a recessed portion, such as a recessed frame, which may be inset, at least in part, from a perimeter of the door in the closed configuration and/or inset, at least in part, from an outer frame of the body to receive the door therein in the closed configuration. In some such embodiments, the protruding locking member(s) may be fixedly coupled with the recessed frame/portion to at least substantially prevent prying forces from being generated in a direction towards movement of the door from the closed configuration to an open configuration.

In some embodiments, a plurality of locking studs or other locking members may be provided. In some such embodiments, a first set of locking studs or other locking members may extend along a first row extending between an upper portion of the body and a lower portion of the body and/or a second set of locking studs (or a first set of the first set extending between the upper and lower portion is not present) or other locking members may extend along a second row extending between a first side of the body and a second side of the body opposite from the first side.

In some embodiments, each of the plurality of locking studs or other locking members may comprise at least one of an enlarged head and a washer configured to provide an engagement surface for a respective slot to lock the door in the closed configuration.

In an example of a lockable structure, such as a home, building, safe, box, vehicle, or other enclosure, the structure may comprise a body and a door coupled with the body and configured to enclose the body when the door is in a closed position. The door may comprise an outer periphery defined in between upper and lower portions of the door and opposing sides of the door, which outer periphery may be viewed when looking at the door in its closed position. In some embodiments, the door may comprise a hinged end and an open end opposite the hinged end.

One or more locking members may be coupled with the body, in some embodiments to an inset region of the body that may define a frame for the structure and/or door. An actuation member may be moveably coupled with the door, preferably incorporated into an internal structure of the door. The actuation member and/or engagement member(s) may be configured to move towards the outer periphery of the door during a locking actuation. For example, in some embodiments, the actuation member may be configured to move towards the open end of the door (in embodiments having a hinged side) during a locking actuation.

The structure may further comprise one or more engagement members coupled with the actuation member, wherein, upon actuation of the actuation member with the door in the closed position, the engagement member(s) may be configured to selectively engage a preferably fixed locking member to prevent the door from being opened. In some embodiments, at least a portion of the engagement member(s) that engages the at least one locking member is configured to avoid extending beyond a perimeter of the door.

In some embodiments, the at least one engagement member may be configured to move between a first position and a second position during a locking actuation, wherein the second position is closer to the outer periphery of the door than the first position. In some embodiments, this movement may be an alternative to the actuation member and/or engagement member(s) being configured to move towards the outer periphery of the door during a locking actuation. However, this movement feature may overlap with the movement towards the outer periphery feature such that both are true in some embodiments.

In some embodiments, the engagement member(s) may be configured to wholly avoid extending beyond the perimeter of the door.

In some embodiments, the locking member(s) may comprise protruding stud(s). In some such embodiments, the engagement member(s) may comprise a plurality of engagement members corresponding with a plurality of protruding studs. In some such embodiments, each of the plurality of protruding studs may comprise an enlarged engagement surface, which may comprise a part of the stud itself, such as an enlarged head, or a separate element coupled with the stud, such as a washer, configured to fixedly engage a corresponding engagement member following the locking actuation to lock the door in the closed position.

In some embodiments, each of the plurality of protruding studs may protrude from a recessed surface inset from an outermost edge of the body. In some such embodiments, each of the plurality of protruding studs may extend in a direction at least substantially perpendicular to an outer and/or inner surface of the door in the closed position.

In an example of a locking mechanism according to some embodiments, the mechanism may comprise a door and an actuator accessible from an outer surface of the door, such as a handle, knob, dial, electronic actuator, or the like. An actuation member, such as a moveable plate, bar, rod, or the like, may be coupled with the door, operably and/or physically coupled with the actuator, and configured to translate towards a perimeter of the door in response to actuation of the actuator. One or more protruding locking members, such as locking studs, may be fixedly mounted to a structure adjacent to the door, such as a frame for the door. One or more engagement members, such as slots, may be coupled with the actuation member and configured to selectively engage a respective protruding locking member upon actuation of the actuator with the door in a closed position to lock the door in the closed position.

In some embodiments, the engagement member(s) may be configured to avoid extending beyond the perimeter of the door in a locked configuration.

The locking mechanism may be incorporated into a variety of structures, such as a safe, a door for a building, a lock box, a door for a mobile home or other RV, a vehicle, an enclosed trailer, or the like.

In some embodiments, the structure may comprise a frame. In some such embodiments, the frame and/or body may be inset from an outer edge of the enclosure such that the door fits within the frame with the outer surface of the door either aligned with the outer edge of the frame or inset from the outer edge of the frame in the closed position.

The features, structures, steps, or characteristics disclosed herein in connection with one embodiment may be combined in any suitable manner in one or more alternative embodiments.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
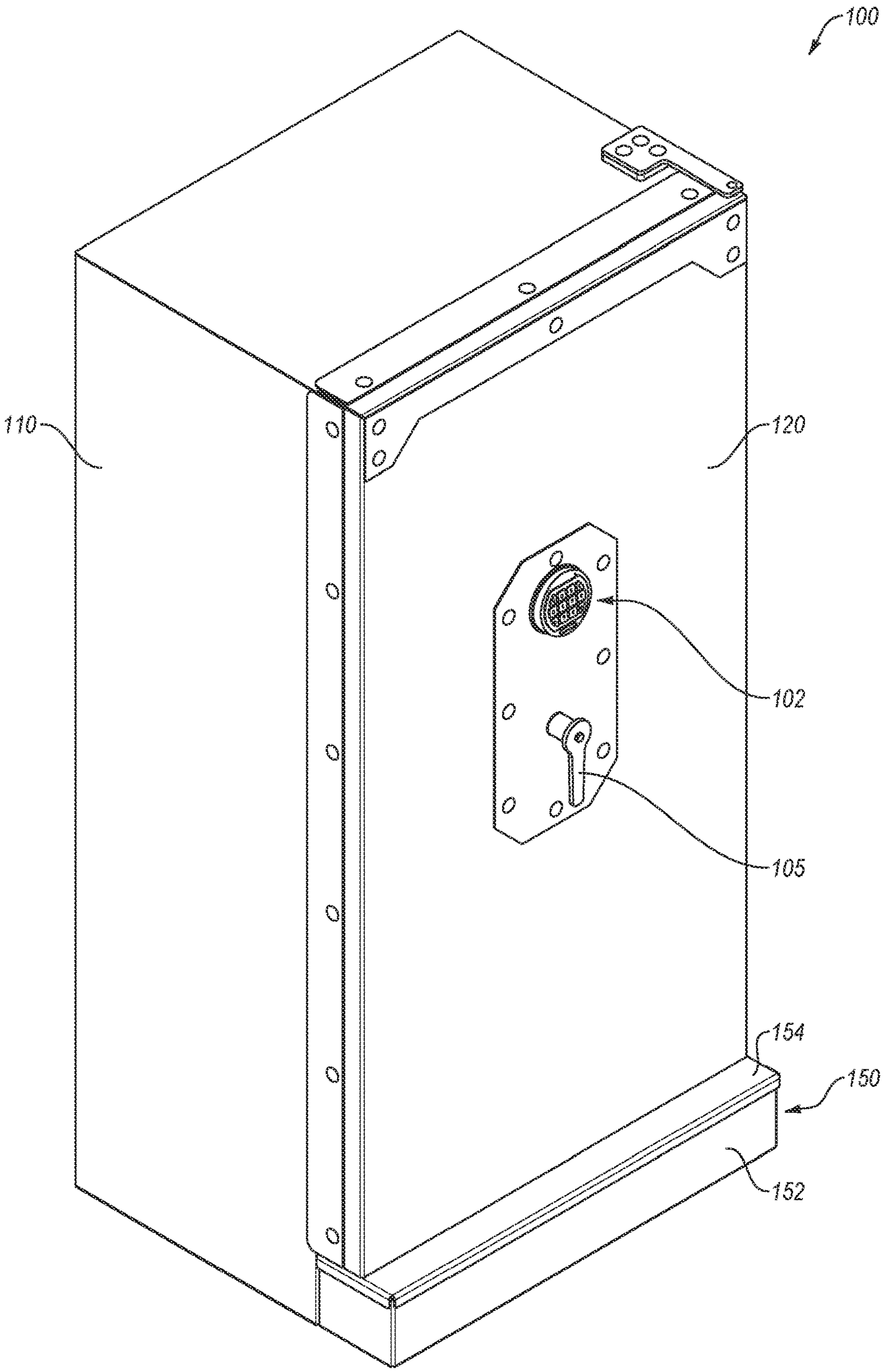
FIG. 1 is a perspective view of a safe comprising a safe locking mechanism according to one embodiment.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure but is merely representative of possible embodiments of the disclosure. In some cases, well-known structures, materials, or operations are not shown or described in detail.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 is a perspective view of an embodiment of a safe 100 incorporating a locking mechanism according to a first embodiment. Safe 100 comprises a main body 110 and a door 120. Door 120 is shown in a closed position and comprises a door locking actuation mechanism 102, which may include, for example, a dial combination lock and/or a keypad to allow a user to input a lock combination. Of course, any other locking actuation mechanism, such as key locks, electronic locks using touchscreen entry, biometric locks, and the like, may be used in alternative embodiments.

An actuator, which, in the case of the depicted embodiment comprises a crank handle 105, is also positioned on door 120, which may be used, after input of a correct combination and/or other input from a user, be allowed to rotate to open door 120. In some embodiments, rotation of crank handle 105 may result in a horizontal movement of one or more internal components to disengage (or engage when locking) locking components of safe 100 to allow for opening of door 120. Of course, a wide variety of other manual or electronic actuators may be used, such as a recessed latch, similar to an RV latch, an electronic actuator, such as a touchscreen and/or keypad operably coupled with a motor, and the like.

FIG. 1 also depicts a storage compartment 150 positioned below door 120. Storage compartment 150 may be used to store various accessories or other items as desired. For example, in embodiments in which safe 100 comprises a gun safe, storage compartment 150 may be used to store ammunition or other accessories, such as scopes, sights, gun cleaning accessories, and the like. In preferred embodiments, compartment 150 comprises a base 152 and a lid 154. Preferably, as discussed in greater detail below in connection with other figures, lid 154 is coupled with door 120 and base 152 is coupled with the body 110 of safe 100, such as to, for example, the frame of door 120.

In this manner, the storage compartment 150 may be configured to automatically open when the safe door 120 is open, and to automatically close, and preferably lock closed, when the safe door 120 is closed. Storage compartment 150 may have other benefits in some embodiments. For example, this portion of a safe is one of the more common regions to experience damage during shipping. Thus, in preferred embodiments, storage compartment 150 may be removable and replaceable to allow for damage in this region to be more easily fixed by simply replacing all or a portion of the compartment 150. In addition, in embodiments in which compartment 150 projects proximally beyond the outer surface of door 120, as shown in FIG. 1, compartment 150 may provide additional stability to safe 100 to prevent, or at least inhibit, tipping.

Figure 2:
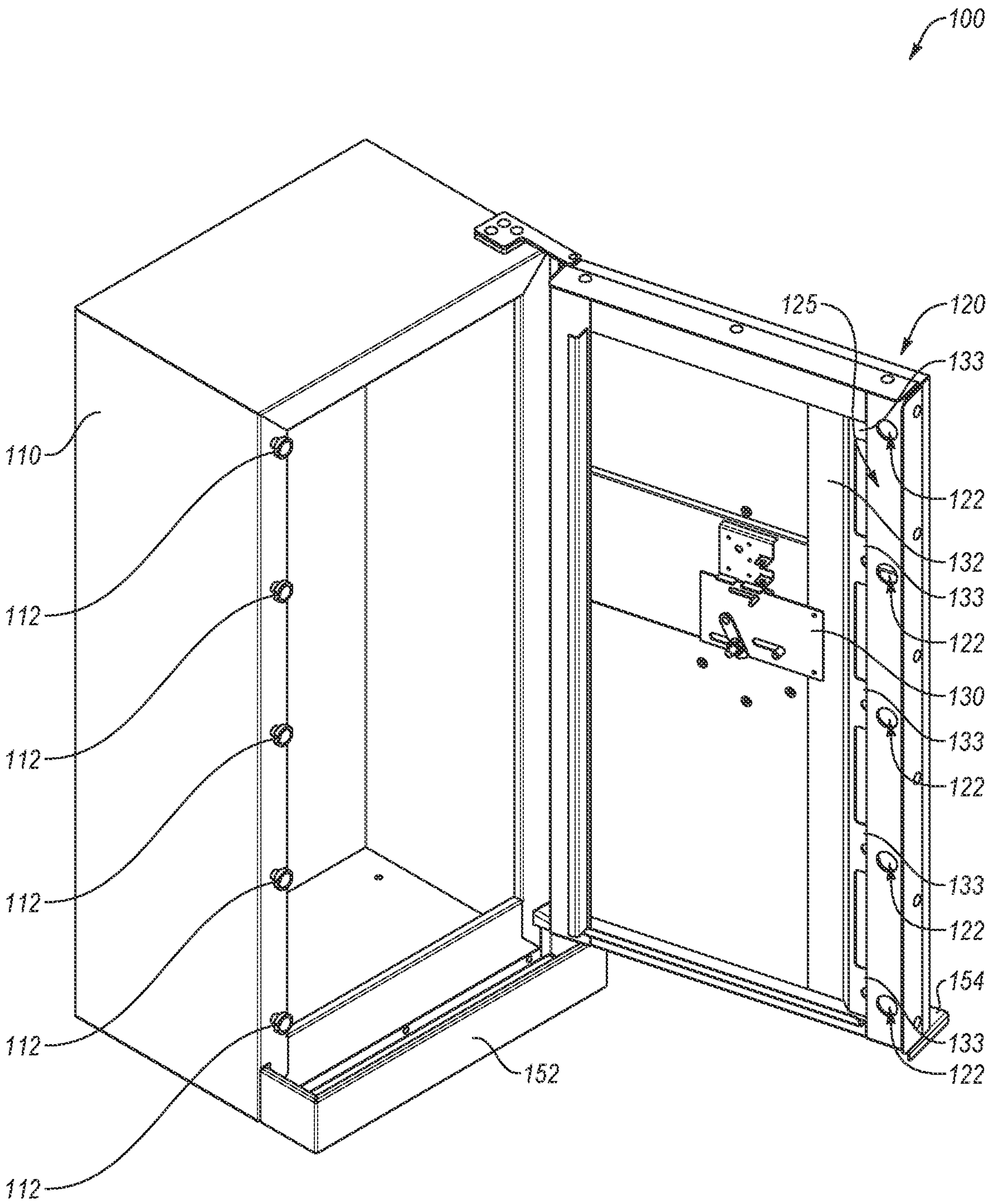
FIG. 2 is a perspective view of the safe with the door open to depict various locking components of the safe locking mechanism.

FIG. 2 depicts safe 100 with door 120 in an open position. As shown in this figure, lid 154 of compartment 150 has been moved away from base 152 to allow for access to its contents. It should be understood that, with respect to both base 152 and lid 154 of compartment 150, preferably these components are coupled to the safe 100 so as to prevent access to their coupling points to the safe 100 when door 120 is closed. For example, coupling slots, flanges, fasters, or the like, may be positioned along the underside of lid 154 to couple to the lower surface of door 120, thereby positioning them within compartment 150 and thereby inaccessible when door 120 is shut. Similar coupling elements used to couple base 152 to safe 100 may, for example, be positioned along the sides and/or lower edge of the doorframe of safe 100, again, preventing access when the lid 154 is shut by closing door 120.

Although not shown in the figures, some embodiments may further comprise a door back, such as a panel. This panel may be removeable or fixed after assembly. In some embodiments, the door back/panel may be removeable to allow for maintenance/repair to the inner workings of the door.

In addition, various locking components of safe 100 are depicted in this figure. For example, movement from an actuation mechanism on the outside of door 120, such as handle 105, may result in movement of actuation member 130, which in the depicted embodiment comprises a plate.

In the depicted embodiment, this movement of actuation plate 130 is lateral. In other words, actuation plate 130 moves from the left side of the door 120 (closer to the hinge) to the right or open side of the door to lock the safe 100 and in the opposite direction to unlock the safe 100.

Actuation plate 130 is coupled to another, side actuation member 132 along its right side (from the perspective of FIG. 2). Thus, lateral movement of actuation plate 130 results in similar lateral movement of actuation member 132, which extends vertically between the upper and lower ends of door 120. As described in still greater detail below, actuation member 132 is slidably coupleable with a series of fixed openings 122 formed along the edge of door 120 opposite the hinged portion. Openings 122 are spaced apart from top to bottom long this edge of the inner door 120 and may, in some embodiments, be formed along an elongated panel or bracket coupled between the upper and lower ends of door 120 in this region. Of course, a variety of alternative embodiments are contemplated, such as those in which each opening 122 is instead independently coupled to door 120, such as by way of mounting a series of tabs into which an opening 122 is formed, to the door frame or another portion of door 120.

A series of locking members 112 are also shown in FIG. 1 protruding from the door frame along the side configured to engage panel 125 and extend through openings 122. In the depicted embodiment, locking members 112 comprise locking studs. As described in greater detail below, locking studs 112 are configured to pass through openings 122 and then be engaged by respective portions of actuation member 132 in order to lock door 120 in place and prevent access to the safe 100.

Those of ordinary skill will further appreciate, however, that a wide variety of alternative embodiments may be possible after having received the benefit of this disclosure of certain preferred embodiments. For example, any number of additional, or fewer, actuation members may be provided, as desired. In addition, some embodiments may comprise a rotatable crank plate, locking bolts, and/or locking pins, as desired, some of which may extend from the top and/or bottom of the door instead of the side, if desired. Some embodiments may further comprise a torque-limiting clutch. In some such embodiments, the clutch may comprise a torque-limiting clutch that limits the amount of force that a user can apply to a lock mechanism from a crank handle. Thus, if a prospective purchaser in a retail store, user, or burglar, for example, applies force to the crank handle without having entered the correct lock combination, used a correct key, or otherwise without having been validated as an authorized user of the safe, the crank handle will be allowed to turn without transferring excessive force to one or more components of the safe, such as a lock mechanism.

In some embodiments, a shear pin may be used, either alone or in combination with a torque-limiting clutch to limit the force that may be applied to the lock. For example, in some embodiments, a shear pin may be used as part of the connection between the handle and the handle shaft, and a torque-limiting clutch may be used inside the door.

Similarly, the clutch may be disengaged in the event that a user, authorized or not, applies force to the crank handle in the wrong direction. This may serve as a security feature and/or a feature to provide for a more robust product that is less prone to inadvertent user damage and therefore less prone to returns, warranty issues, and the like. It should also be understood that, although the preferred embodiments described herein are shown in the context of a safe, it may be possible to apply the teachings herein to other locking doors, such as freezer doors or security doors.

Some embodiments may additionally, or alternatively, comprise one or more features to prevent, or at least limit, the transfer of force applied along the axis of a shaft coupled with the crank handle to other critical, internal components of the safe. In this manner, a would-be thief, for example, will be unable, or at least thwarted in his efforts, to access the interior of the safe by pulling or pushing on this shaft.

Some embodiments may comprise one or more "failsafe" or backup features so as to further protect a lock mechanism, and/or one or more other components of the safe, in the event of unwanted rotation of the crank shaft, such as may result from tampering of the safe. Some such backup features may also prevent unwarranted access to the interior of the safe. For example, some embodiments may be configured such that the crank shaft is coupled with the clutch and/or lock in such a way that the coupling will break or otherwise fail before sufficient force/torque is applied to the shaft to result in damage to and/or opening of the safe. Examples of such clutch mechanism can be found in U.S. Pat. No. 9,410,355 titled "SAFES AND RELATED LOCKING ENCLOSURES," the entire contents of which are hereby incorporated herein by reference.

Figure 3A:
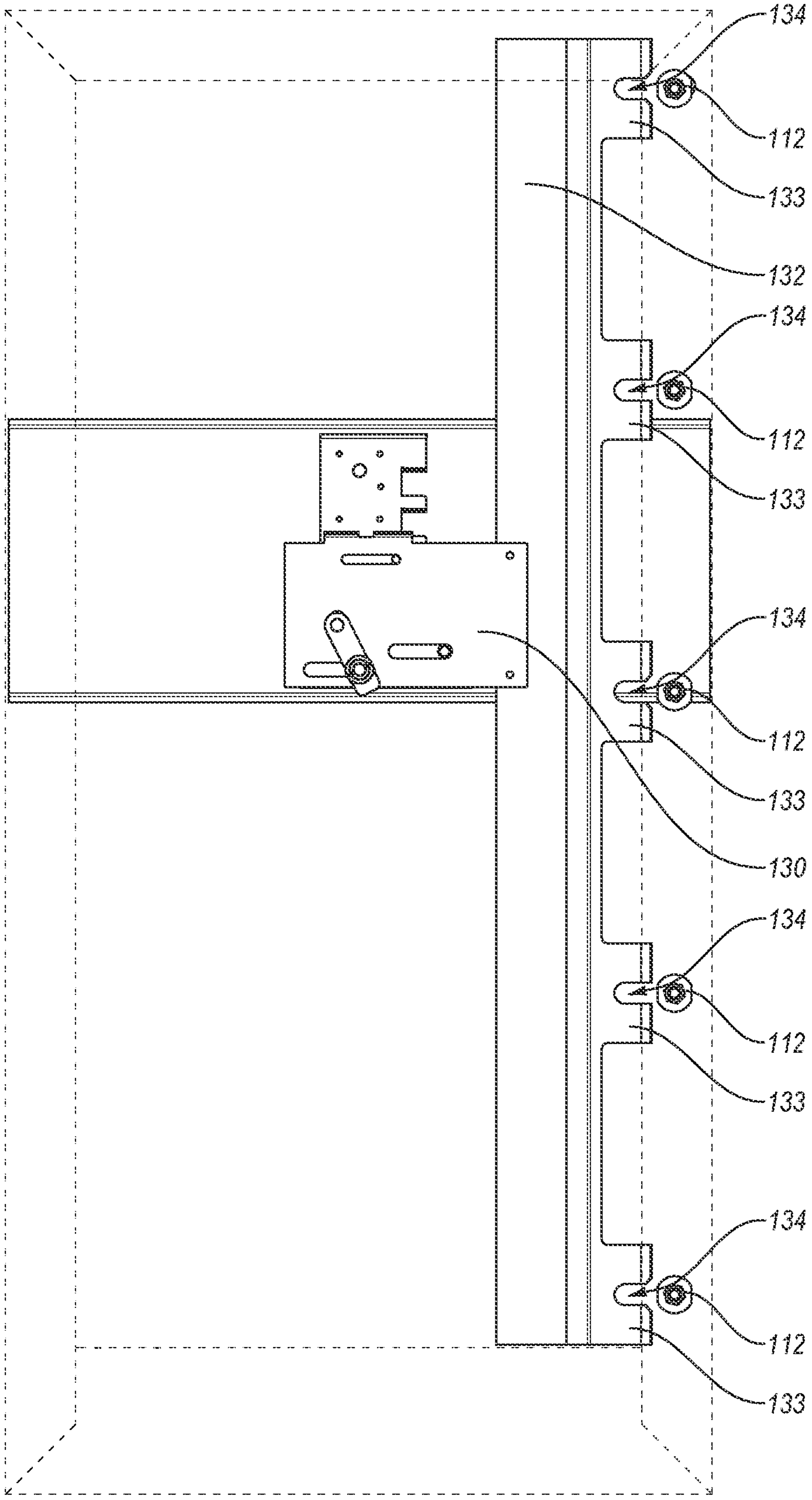
FIGS. 3A-3C depict the locking components during various stages during a process of locking the safe.
Figure 3B:
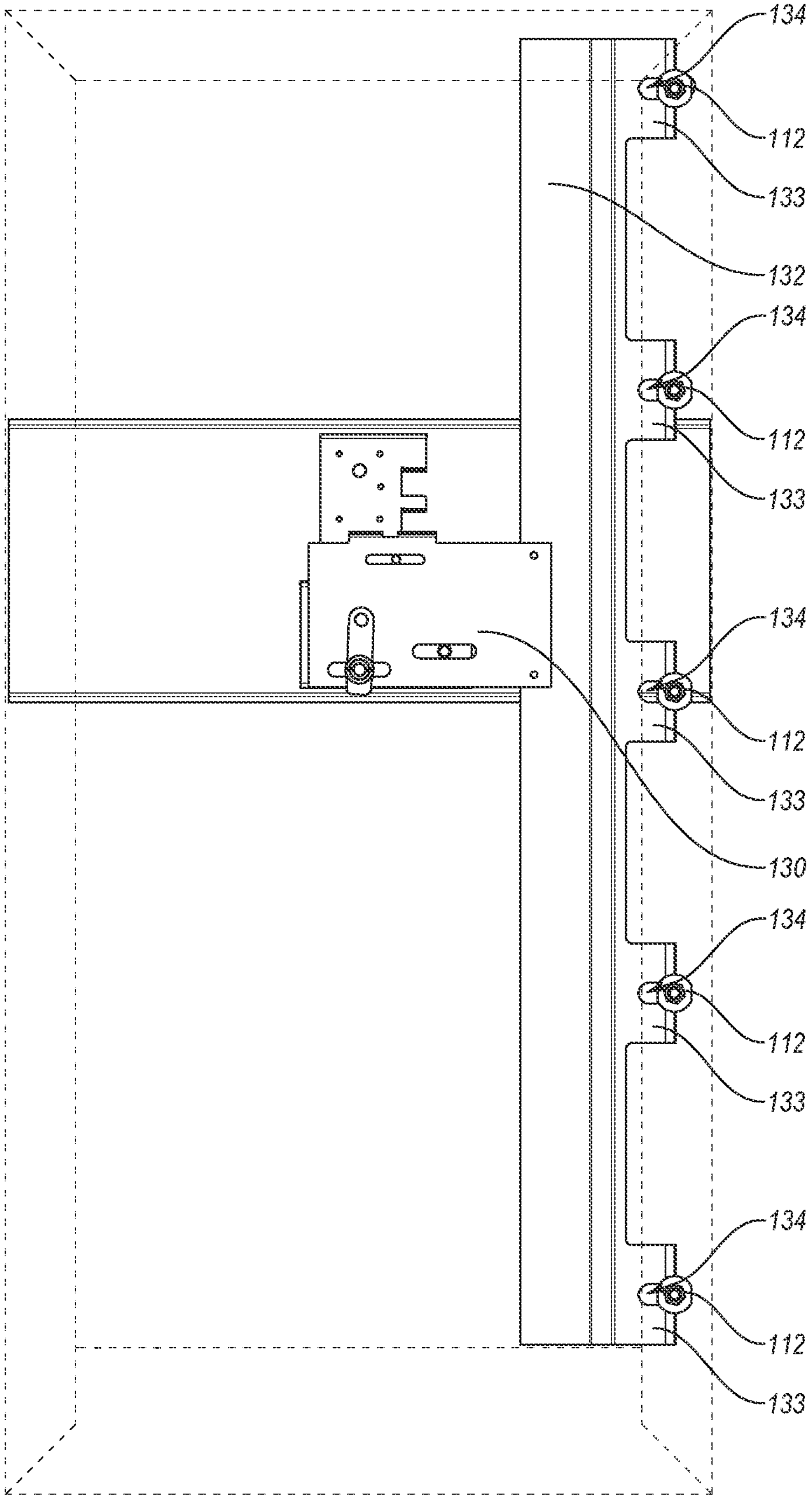
Figure 3C:
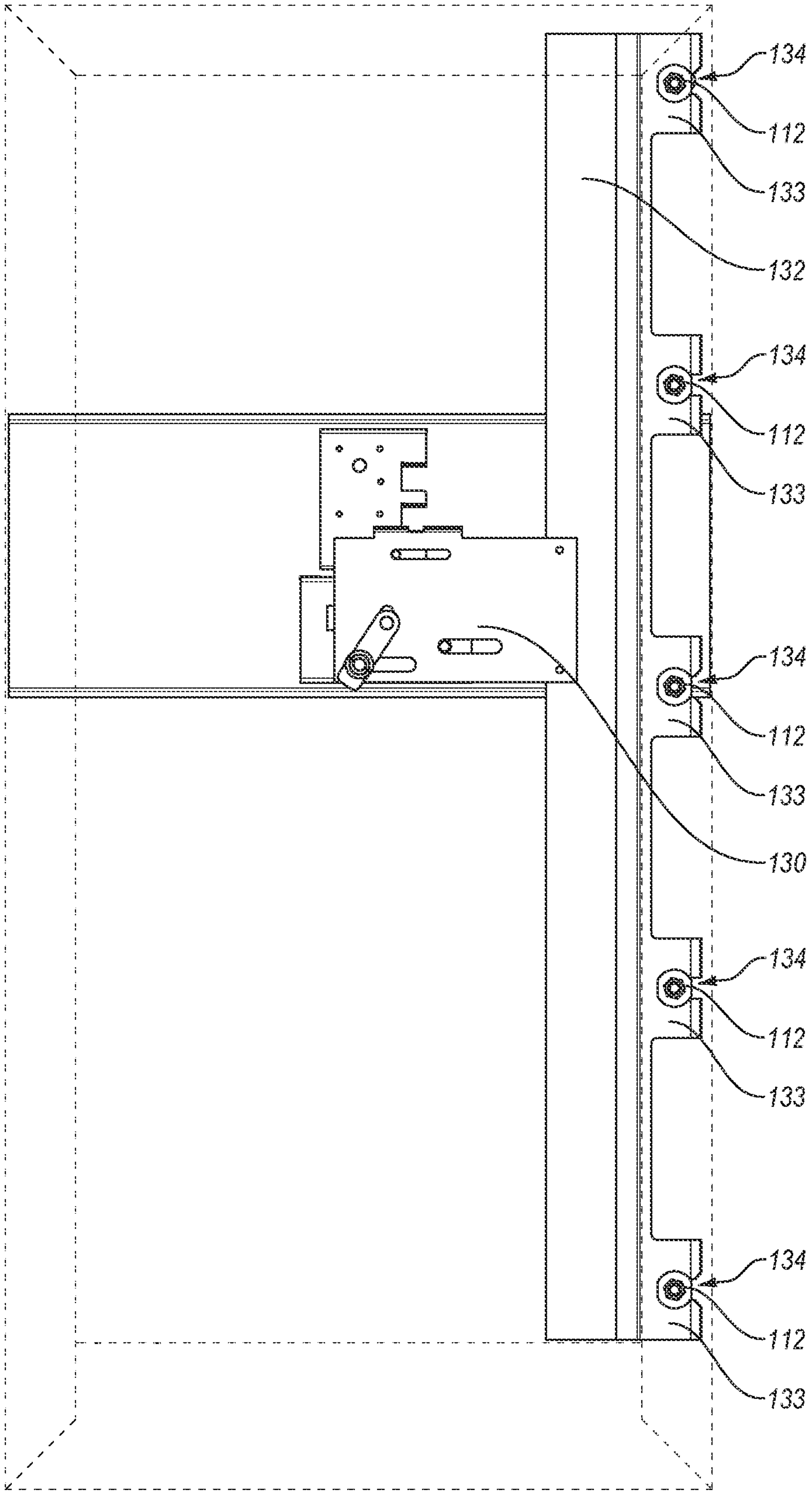

FIGS. 3A-3C depict various stages of a locking sequence in which door 120 of safe 100 is, after having been closed, locked using various features of the locking assembly of safe 100. More particularly, these figures depict lateral movement of actuation plate 130 to the right, which, as mentioned above, corresponds with the side of door 120 opposite the hinged side and which movement may be generated by, for example, rotation of a handle 105 and/or crank shaft. This movement of actuation plate 130 results in similar lateral movement of actuation member 132, which, again, extends vertically between the upper and lower ends of door 120.

Actuation member 132, which in the depicted embodiment comprises an elongated bar, comprises a series of tabs 133 or other slotted members spaced apart along an end of actuation member 132 closest to the non-hinged side of door 120. Each protruding, moveable tab 133 comprises a slot 134 having an open end. The number of tabs 133, and therefore the number of slots 134, preferably corresponds with the number of fixed openings 122 formed in fixed tabs or formed in one or more other preferably fixed portions of the safe door 120, such as in an elongated bar or panel 125, for example.

Because tabs 133 are preferably slightly mis-aligned with panel 125 and/or fixed tabs, as actuation member moves 132 laterally, the slots 134 of each tab 133 partially overlap with openings 122 in panel 125 and/or the fixed tabs positioned adjacent to the outer edge of the inner side of the safe door 120. As the closed end of each slot 134 extends past the proximal (left) side of each corresponding opening 122, the effective size of each opening 122 decreases. Due to the presence of locking studs 112 within each opening 122, along with the preferred use of locking studs 112 having enlarged heads, the closed end of each slot 134 can engage the neck region of each corresponding locking stud 112 to prevent the door 120 from being opened without a reversal of the sequence shown in FIGS. 3A-3C to disengage the slots 134 from the locking studs 112.

Of course, a variety of alternative embodiments are contemplated. For example, slots or other openings may instead be formed along one or more regions of the door frame and locking members may instead be formed along the door and configured to extend and/or retract to engage the slots/openings. An example of such an embodiment will be discussed in greater detail below with reference to FIGS. 6-10B.

In preferred embodiments, the retractable or otherwise moveable members of the door, such as door 120, are configured to remain entirely within the frame and/or outline of the door 120. This may provide a number of benefits over prior art designs that rely on extending locking elements out of the door to engage the door frame. For example, by providing the moveable locking elements within the door and engaging the door internally from within by engaging elements coupled with the door frame, a stronger locking configuration may be achieved.

However, it should be understood that, in some contemplated embodiments, this feature need not be present. For example, it is contemplated that some embodiments may comprise locking studs 112 that are engaged by elements, such as slots 134, that may alternatively extend beyond the perimeter of the door in the locked configuration.

As another contemplated alternative embodiment, although it may be preferred to use locking studs or other locking members that have enlarged heads or another enlarged portion preferably adjacent to the proximal head or tip of the locking member, which may be used to provide one or more locking surfaces/features for engagement with slots or other features of the locking assembly, in other embodiments, other locking features may be provided. For example, in some embodiments, washers or other secondary elements may be used to provide this locking engagement. In other embodiments, locking studs or other fasteners may be used that comprise one or more recessions or indentations that may be configured to allow for engagement with a moveable slot or other locking feature, such as annular grooves formed in the shaft portion of the locking member/fastener, for example.

It should be understood that, in some embodiments, a standard bolt may be used as a locking member, in some cases with one or more washers and/or a bushing. In addition, in some embodiments, the stud, bolt, or other locking member may comprise an integral washer or other integral enlarged region rather than a separate washer. A similar effect may be produced by having a stud with a large head or other enlarged feature, typically with a smaller body and smaller diameter threaded portion on the end. However, it should also be understood that the locking members need not be threaded in all cases. Instead, the stud/locking members may comprise shouldered rivets, welded studs, or the like.

Figure 4:
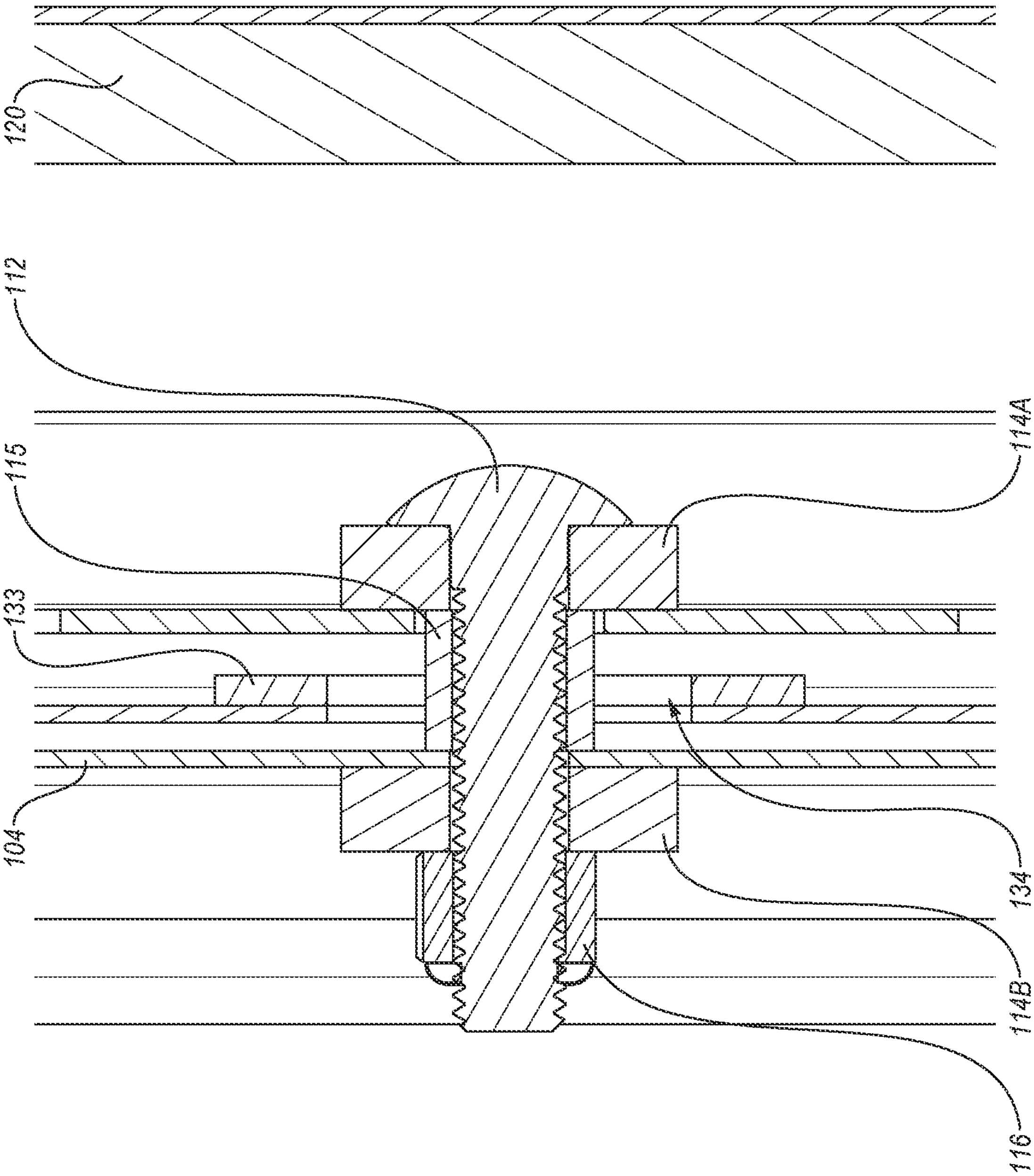
FIG. 4 is a cross-sectional view taken through one of the locking studs of the safe locking mechanism.

FIG. 4 is a cross-sectional view taken through one of the locking members/studs 112. As shown in this figure, locking stud 112 may be coupled with the door frame of safe 100 via a pair of washers 114A/114B. By using a spacer 115, sufficient space between the outer washer 114A and a wall 104 of the door frame or another portion of safe 100. This preferably provides spacing to both allow locking stud 112 to pass through fixed openings 122 and to allow for the structure of moveable tabs 133 defining slots 134 to pass by spacer 115 and engage the outer washer 114A and/or the head of locking stud 112.

As also shown in FIG. 4, preferably the inner washer 114B and a locking nut 116, or similar features, are provided only with access from within the enclosed/locked region of safe 100. Similarly, the outer locking washer 114A and the head of locking stud 112 are inaccessible from the outside of the safe 100 following locking. In this manner, the locking studs 112 cannot be rotated or removed from the outside after the safe 100 has been locked.

Figure 5:
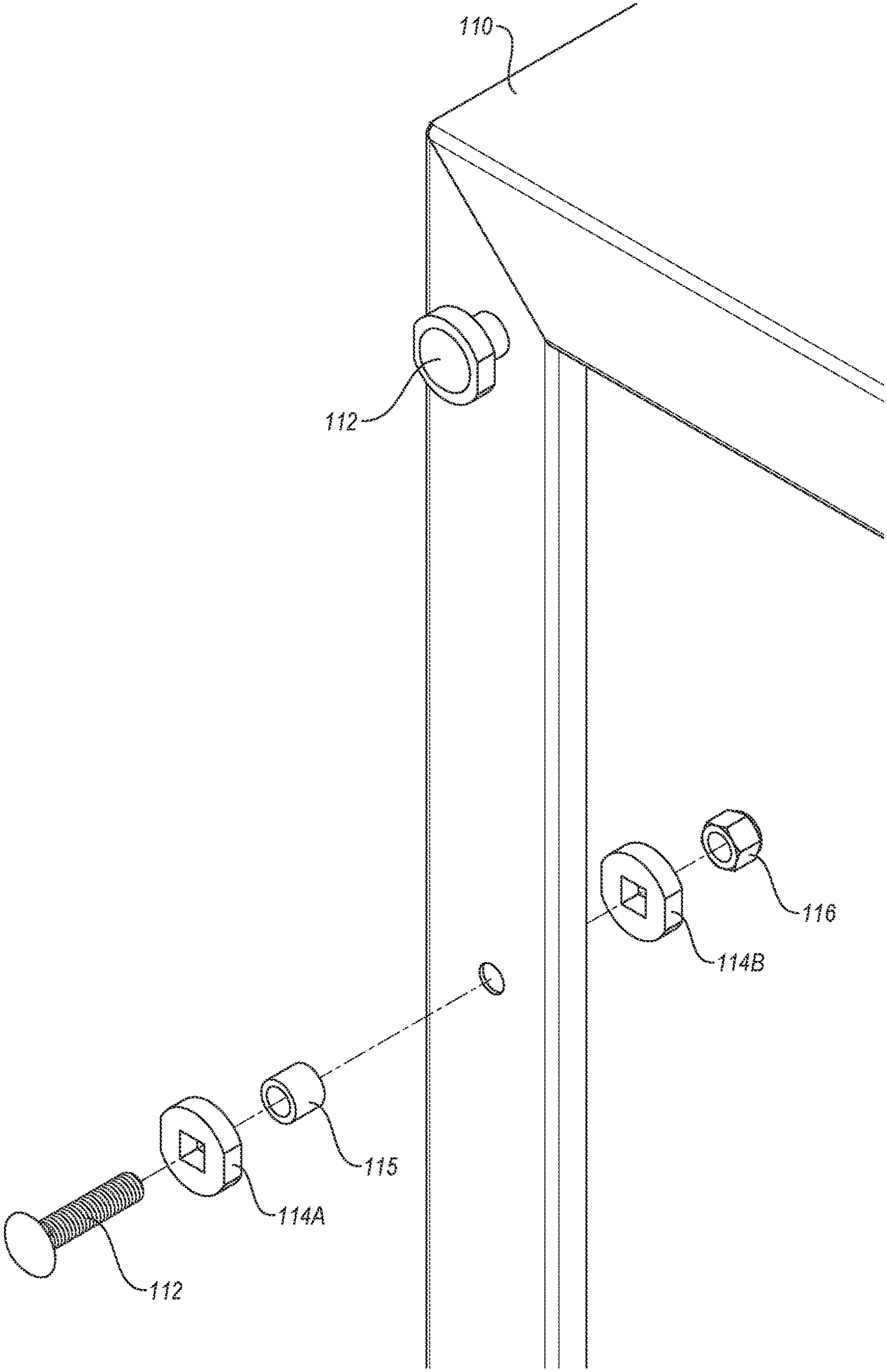
FIG. 5 is an exploded view of the locking studs and corresponding elements used to mount them to the safe.

FIG. 5 is an exploded view of the various locking components associated with fixed locking studs 112 and how they are coupled to the frame of the safe door 120. As shown in this figure, each locking stud 112 may be inserted through outer washer 114A, which is spaced apart from the door frame by spacer 115. Stud 112 may then pass through inner washer 114B on the inner side of the door frame and be locked in place with nut 116.

Figure 6:
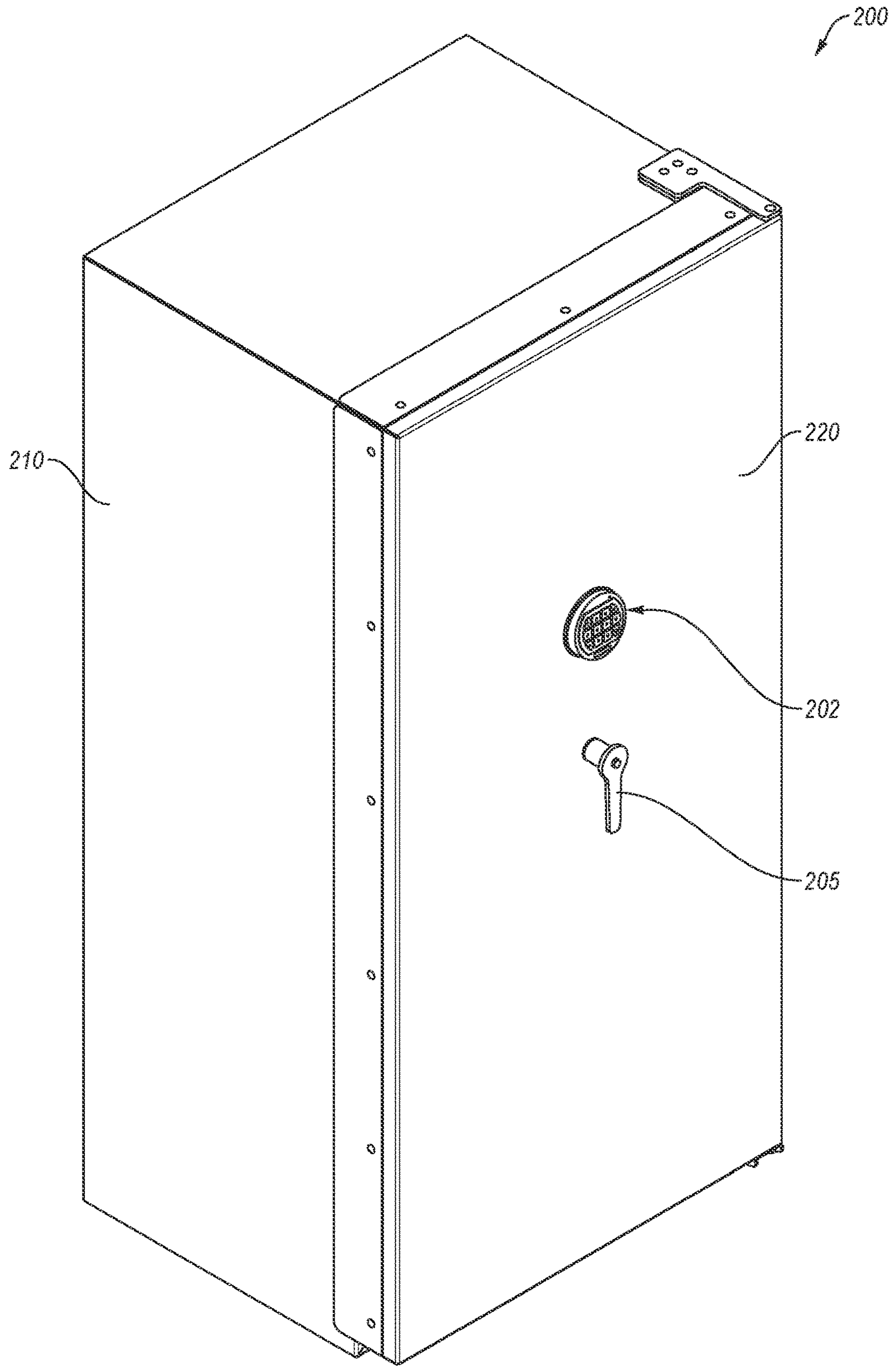
FIG. 6 is a perspective view of a safe comprising a safe locking mechanism according to another embodiment.

FIG. 6 is a perspective view of an embodiment of a safe 200 incorporating a locking mechanism according to another embodiment. Safe 200 comprises a main body 210 and a door 220, which is shown in a closed position in this figure and comprises a door locking actuator 202, which may include, for example, a dial combination lock and/or a keypad to allow a user to input a lock combination. Like safe 100, safe 200 comprises a crank handle actuator 205, which may be used, after input of a correct combination and/or other input from a user, be allowed to rotate to open door 220. In some embodiments, rotation of crank handle 205, or another suitable actuation mechanism, many of which will be readily available to those of ordinary skill in the art, may result in a horizontal movement of one or more internal components to disengage (or engage when locking) locking components of safe 200 to allow for opening of door 220.

Although not shown in the figures associated with safe 200, it should be understood that an accessory storage compartment, such as compartment 150, may be provided in contemplated alternative embodiments.

Figure 7:
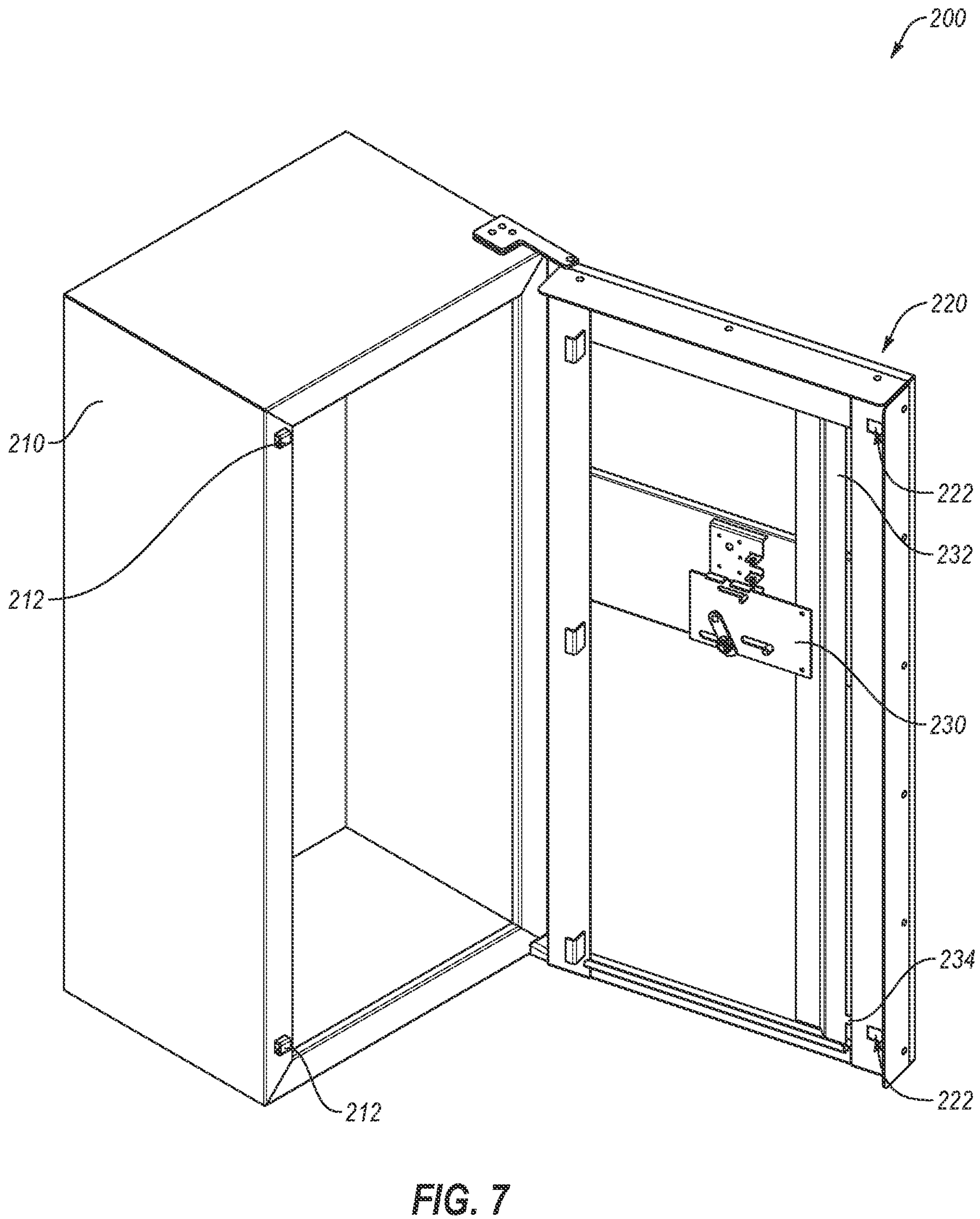
FIG. 7 is a perspective view of the safe with the door open to depict various locking components of an alternative safe locking mechanism.

FIG. 7 depicts safe 200 with door 220 in an open position. An internal actuation mechanism is also depicted in this figure. More particularly, movement from a door opening actuation mechanism on the outside of door 220, such as handle 205, may result in movement of actuation member 230, which in the depicted embodiment comprises a plate.

In the depicted embodiment, this movement of actuation plate 230 is lateral, but need not be in all contemplated embodiments. For example, in some embodiments, movement of an actuation plate or another similar component may be vertical, which may result in a similar coupling/locking to features on upper and/or lower edges of the door frame instead of on the lateral edge of the door frame opposite the hinged portion of safe door 220.

Actuation plate 230 is coupled to another, side actuation member 232 (again, this may be an upper or lower actuation member in other embodiments) along its right side (from the perspective of FIG. 7). Thus, lateral movement of actuation plate 230 results in similar lateral movement of actuation member 232, which extends vertically between the upper and lower ends of door 220.

As described in greater detail below, actuation member 232 is slidably coupled with one or more fixed openings 222 formed along the edge of the inner surface of door 220 opposite the hinged portion. In the depicted embodiment, openings 222 are placed at the upper and lower ends of the safe door 220. However, in other embodiments, these openings 222 may be additionally, or alternatively, positioned in between the upper and lower ends, such as spaced apart from top to bottom long this edge of the inner door 220. In the depicted embodiment, openings 222 are formed within an elongated panel or bracket coupled between the upper and lower ends of door 220. However, in alternative embodiments, each opening 222 may instead be independently coupled to door 220, such as by way of mounting a series of tabs into which an opening 222 is formed, to the door frame or another portion of door 220.

A series of locking members 212 are also shown in FIG. 7 protruding from the door frame along the side configured to engage openings 222. Unlike safe 100, safe 200 comprises locking members 212 that are, as better seen in later figures, locking slots that are configured to configured to receive a protruding locking member 234 extending from actuation member/bar 232 in order to lock door 220 and prevent access to the contents of safe 200. Again, a wide variety of alternative embodiments may be possible, as described throughout this disclosure.

Figure 8A:
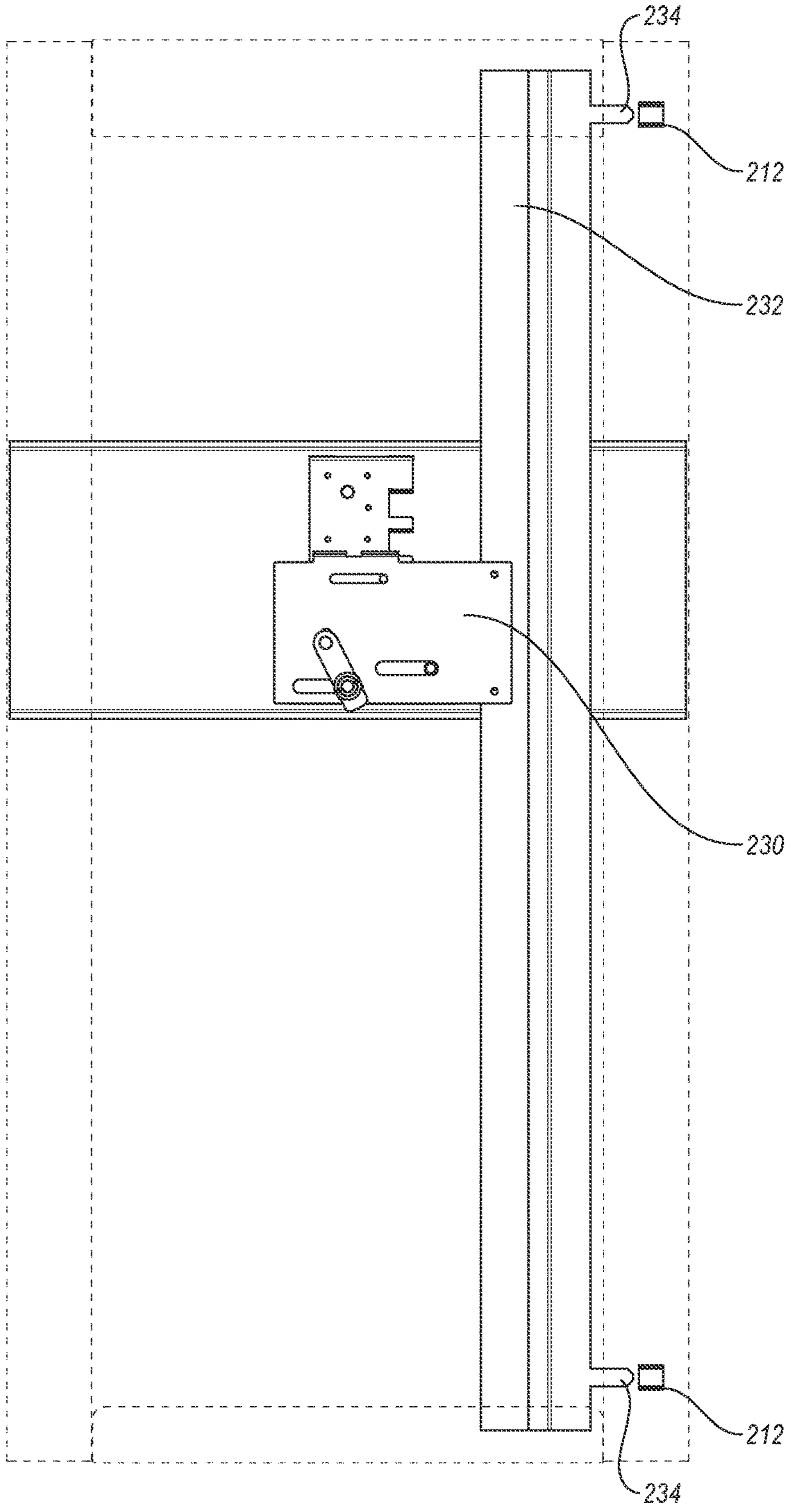
FIGS. 8A-8C depict the locking components during various stages during a process of locking the safe.
Figure 8B:
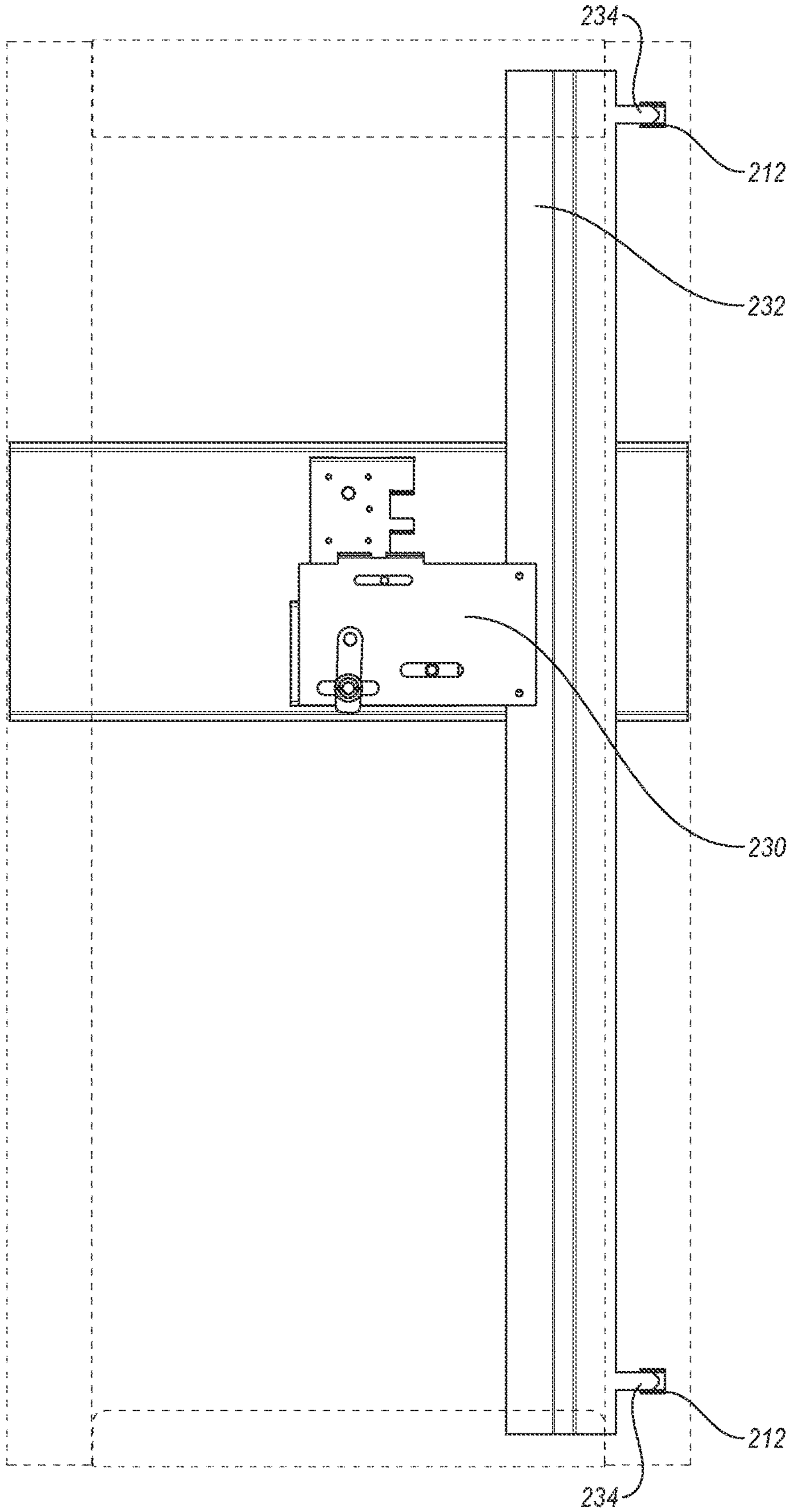
Figure 8C:
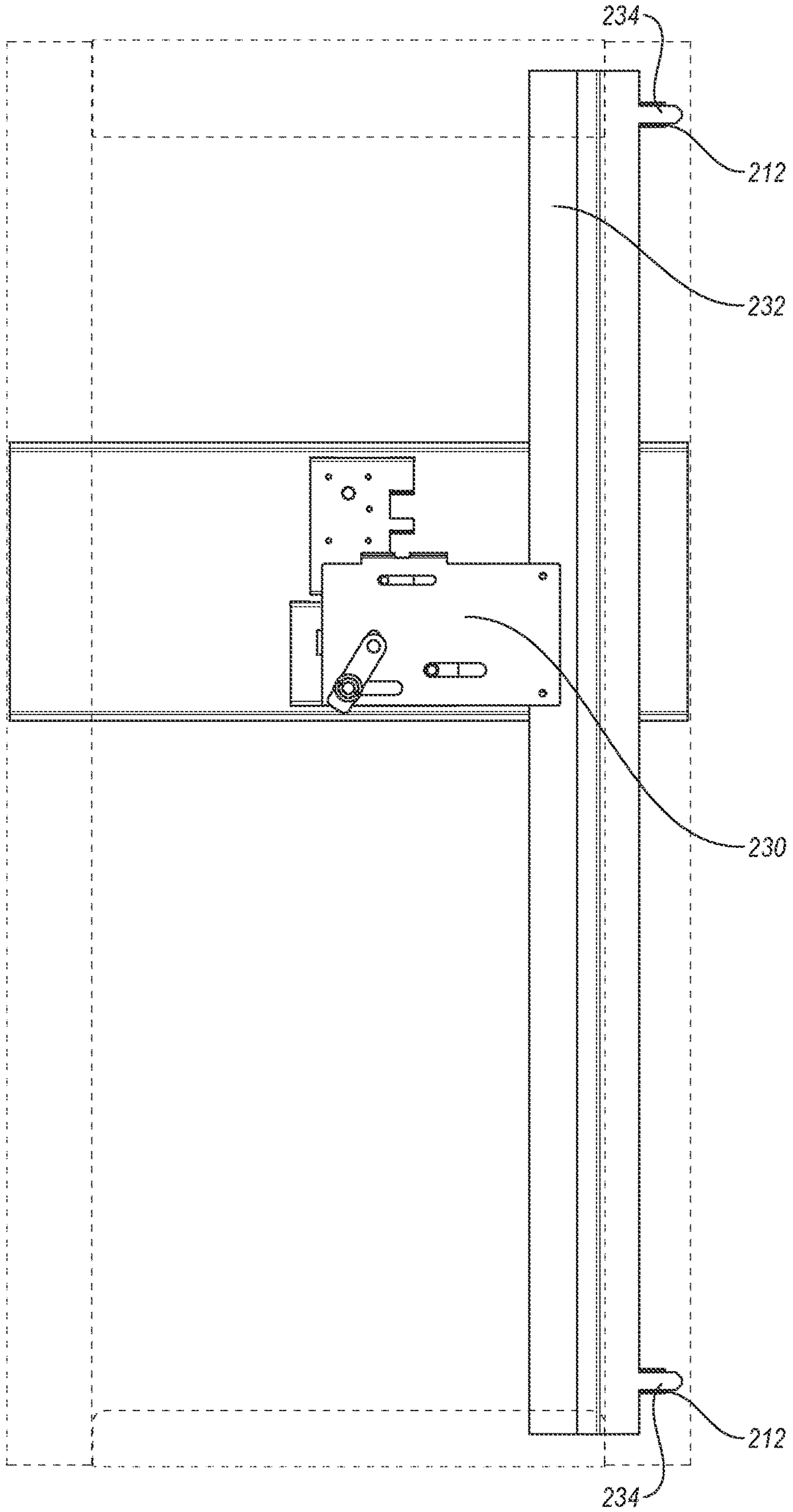

FIGS. 8A-8C depict various stages of a locking sequence in which door 220 of safe 200 is, after having been closed, locked using various features of the locking assembly of safe 200. More particularly, these figures depict lateral movement of actuation plate 230 to the right, which, as mentioned above, corresponds with the side of door 220 opposite the hinged side and which movement may be generated by, for example, rotation of a handle 205 and/or crank shaft. This movement of actuation plate 230 results in similar lateral movement of actuation member/bar 232, which, again, extends vertically between the upper and lower ends of door 220.

Actuation member/bar 232, comprises a protruding locking members 234, which may comprise, for example, blades, pins, bolts, or the like, and which are spaced apart along actuation member 232. The number of moveable locking members 234 corresponds with the number of fixed locking members 212. Although in the depicted in embodiment, there are only two pairs of corresponding locking members 212/232, this number may be greater (or only one) in alternative embodiments.

Upon closing the door 220, slots 212, which may be defined by protruding brackets, pass through openings 222. Then, as shown in the sequence of FIGS. 8A-8C, as actuation member 232 moves laterally, protruding locking members 234 pass through slots 212. Due to slots 212 being defined by closed brackets, once this has happened, the brackets or other structural features of locking members 212 prevent the door 220 from being opened without a reversal of the sequence shown in FIGS. 8A-8C to disengage the locking members 234 from the slots defined by locking members 212.

Like safe 100, the retractable or otherwise moveable members of the door 220 of safe 200 are preferably configured to remain entirely within the frame and/or outline of the door 220.

Figure 9:
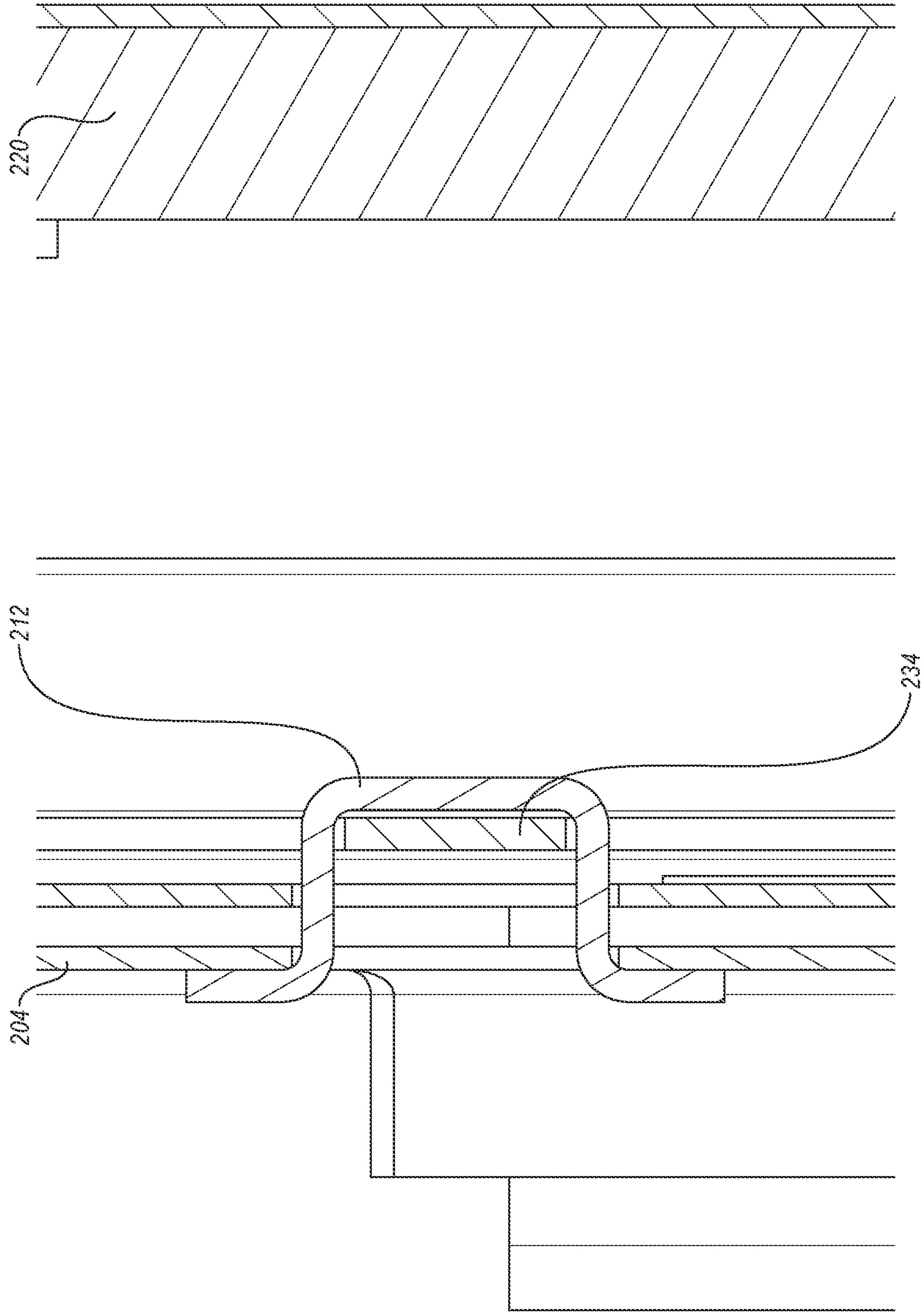
FIG. 9 is a cross-sectional view taken through one of the locking brackets defining a locking slot following the locking process.

FIG. 9 is a cross-sectional view of the interaction between the locking mechanisms 212 and 234 of safe 200. As shown in this figure, locking member 212 may be coupled with the door frame of safe 200 by way of an opposing pair of angled legs that may extend behind a wall 204 of the door frame or another portion of safe 200.

Figure 10A:
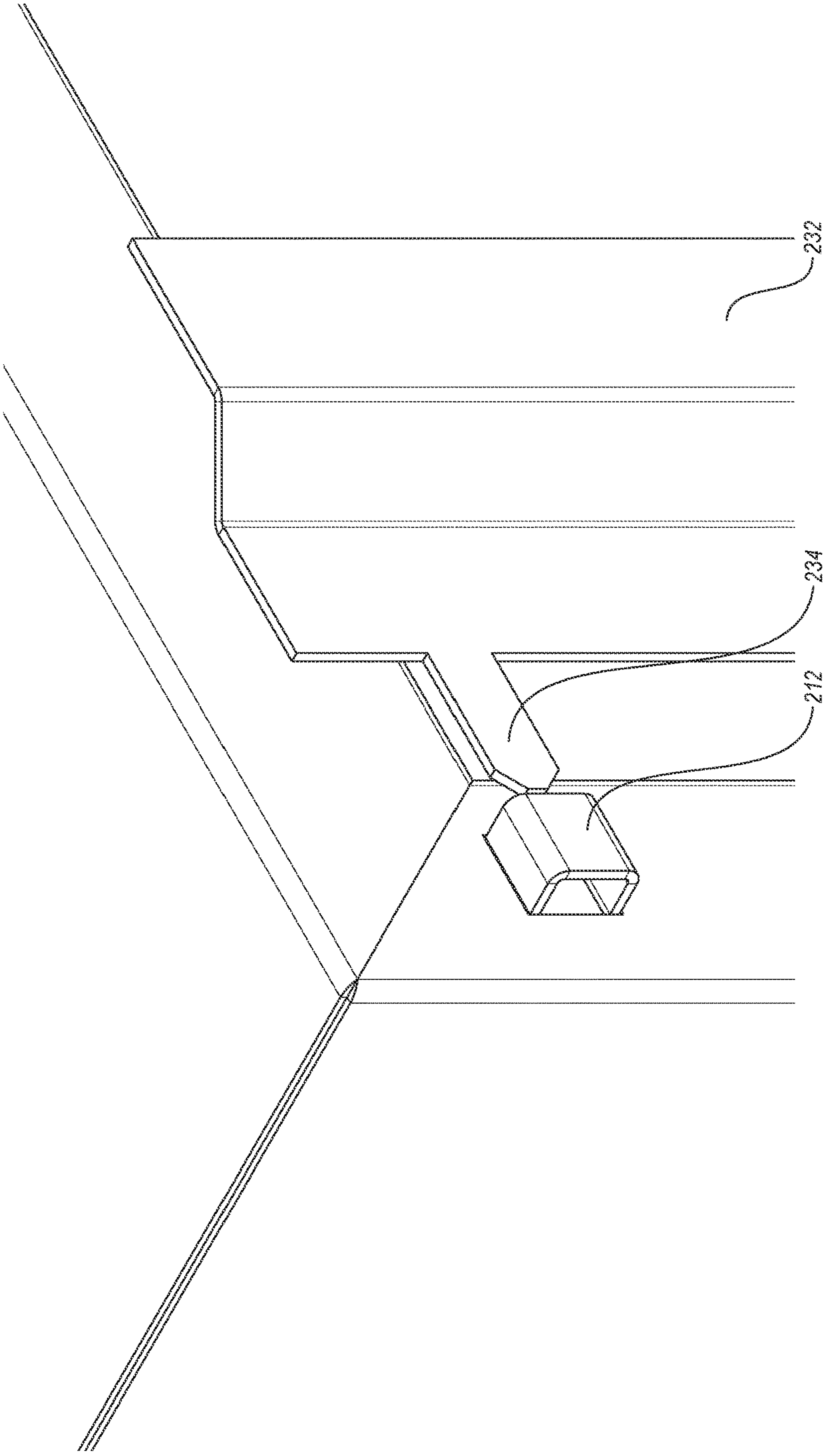
FIGS. 10A and 10B are partial, perspective views of the protruding locking members being received in the locking slots of the safe.
Figure 10B:
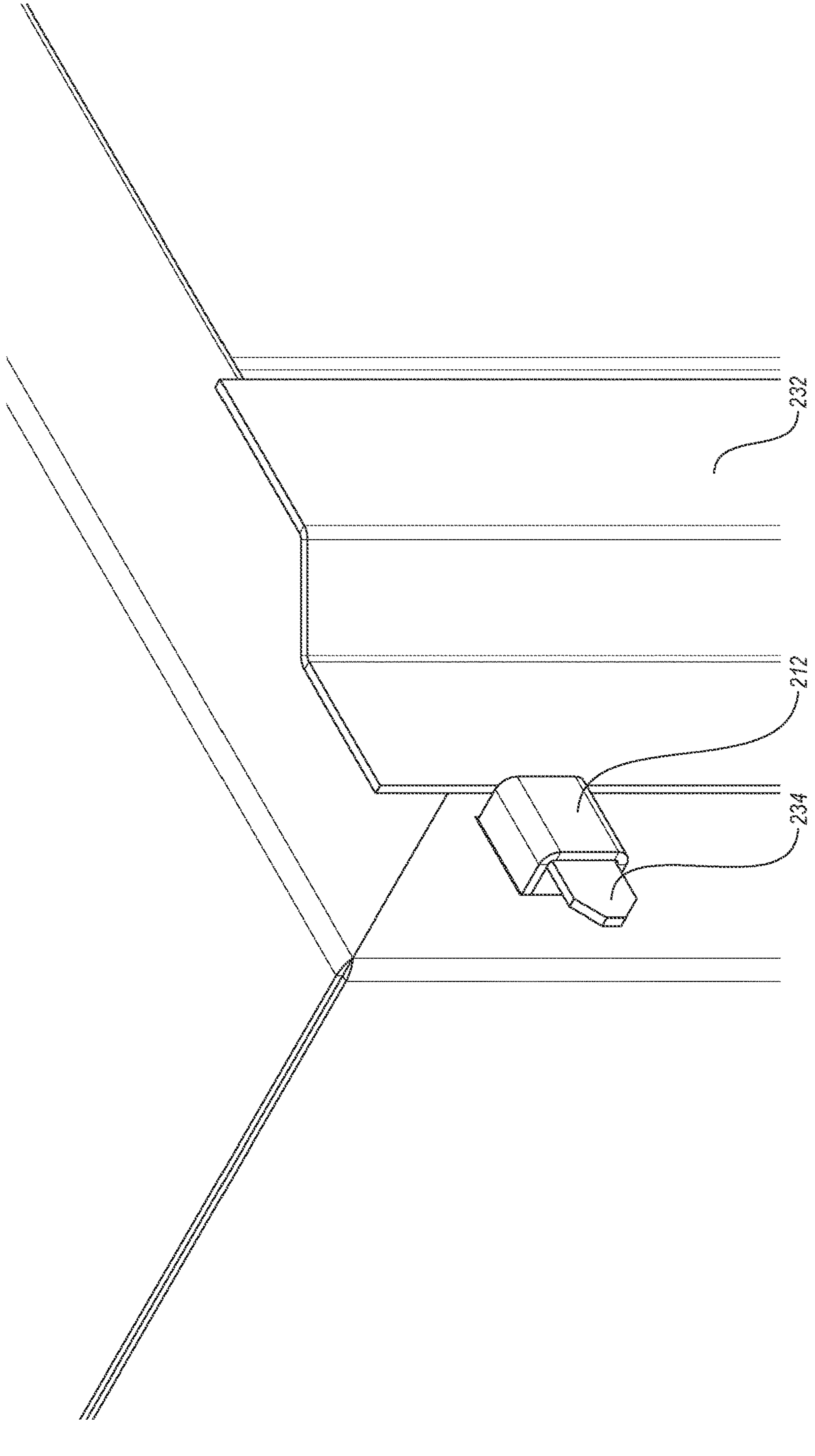

As also shown in FIG. 9, the locking member 212 may protrude from the door frame to allow for the blades, pins, or other suitable protruding/moveable locking members 234 to at least partially pass therethrough to prevent door 220 from begin opened. FIGS. 10A and 10B are perspective views again illustrating the movement of these locking members 234 to pass within the slots of locking members 212.

Figure 11:
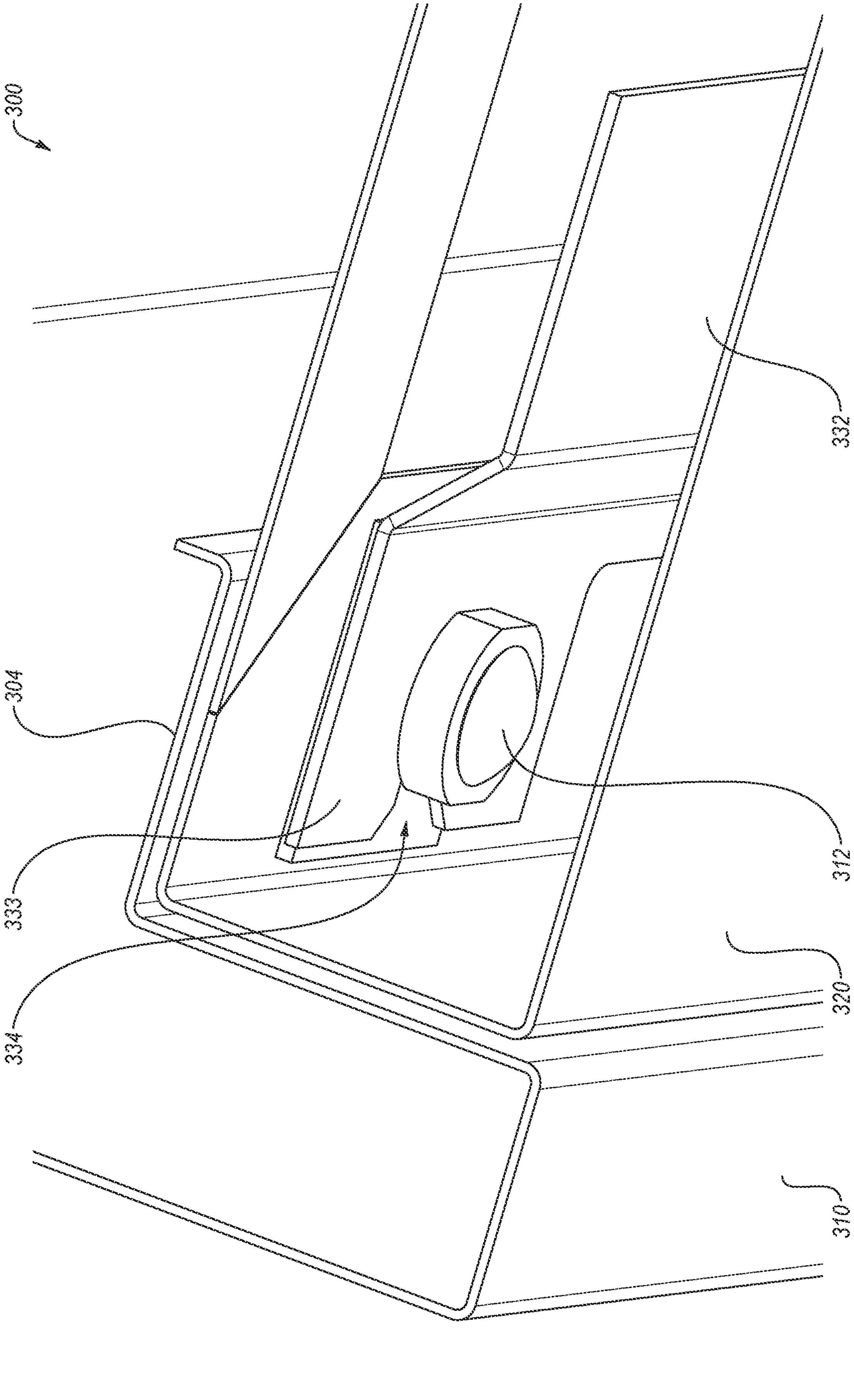
FIG. 11 is a cross-sectional view showing the interface between the door, door frame, and slidable locking components of the locking assembly of a safe according to other embodiments.

FIG. 11 is a cross-sectional view of a portion of another safe 300 showing the interface between the door 320, door frame 310, and slidable locking components of the locking assembly of the safe 300. In this embodiment, the door frame 310 comprises a recessed surface 304 to which the locking studs/members 312 may be fixedly coupled. This may provide an added layer of security to the assembly.

Actuation member 332 further comprises a series of tabs 333 that are both spaced apart along an end of actuation member 332 closest to the non-hinged side of door 320 and are, as shown in FIG. 11, angled inwardly towards the enclosed portion of the safe 300, which may be useful to provide clearance and avoid unnecessary sliding contact between adjacent elements of the assembly, for example. Each protruding, moveable tab 333 comprises a slot 334 having an open end. In the depicted embodiment, these slots 334 are partitioned into a wider portion at the open end and a narrower portion configured to securely couple with the stud 312 inwardly of the open end.

Figure 12:
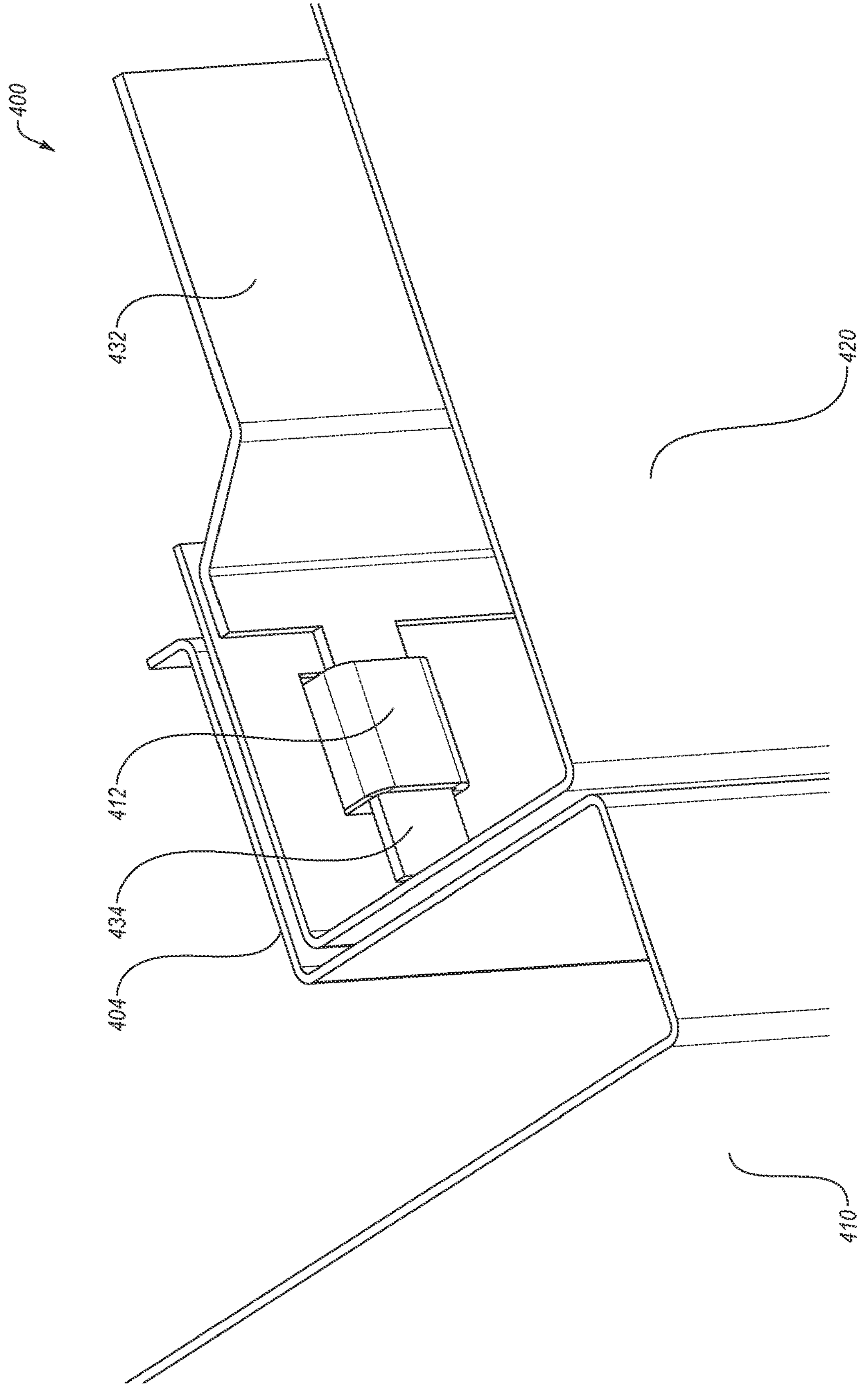
FIG. 12 is a cross-sectional view showing the interface between the door, door frame, and slidable locking components of the locking assembly of a safe according to still other embodiments.

FIG. 12 is a cross-sectional view of a portion of yet another safe 400 showing the interface between the door 420, door frame 410, and slidable locking components of the locking assembly of the safe 400. In this embodiment, the door frame 410 again comprises a recessed surface 404 to which the fixed brackets/slots 412 may be fixedly coupled. Actuation member 432 further comprises a series of protruding bars 434 or other slidable locking members that are both spaced apart along an end of actuation member 432 closest to the non-hinged side of door 420 and are angled inwardly towards the enclosed portion of the safe 400. Each protruding, moveable locking member 434 is configured to slidably extend through one of the fixed locking brackets/slots 412.

Figure 13:
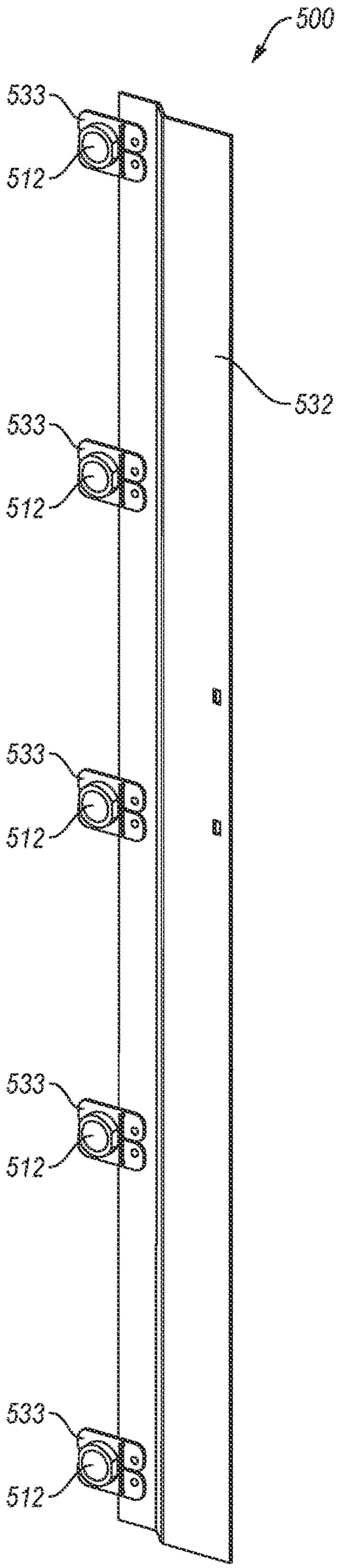
FIG. 13 is a perspective view showing an alternative actuation member having pivotable, spring-loaded locking slot according to some embodiments.
Figure 14:
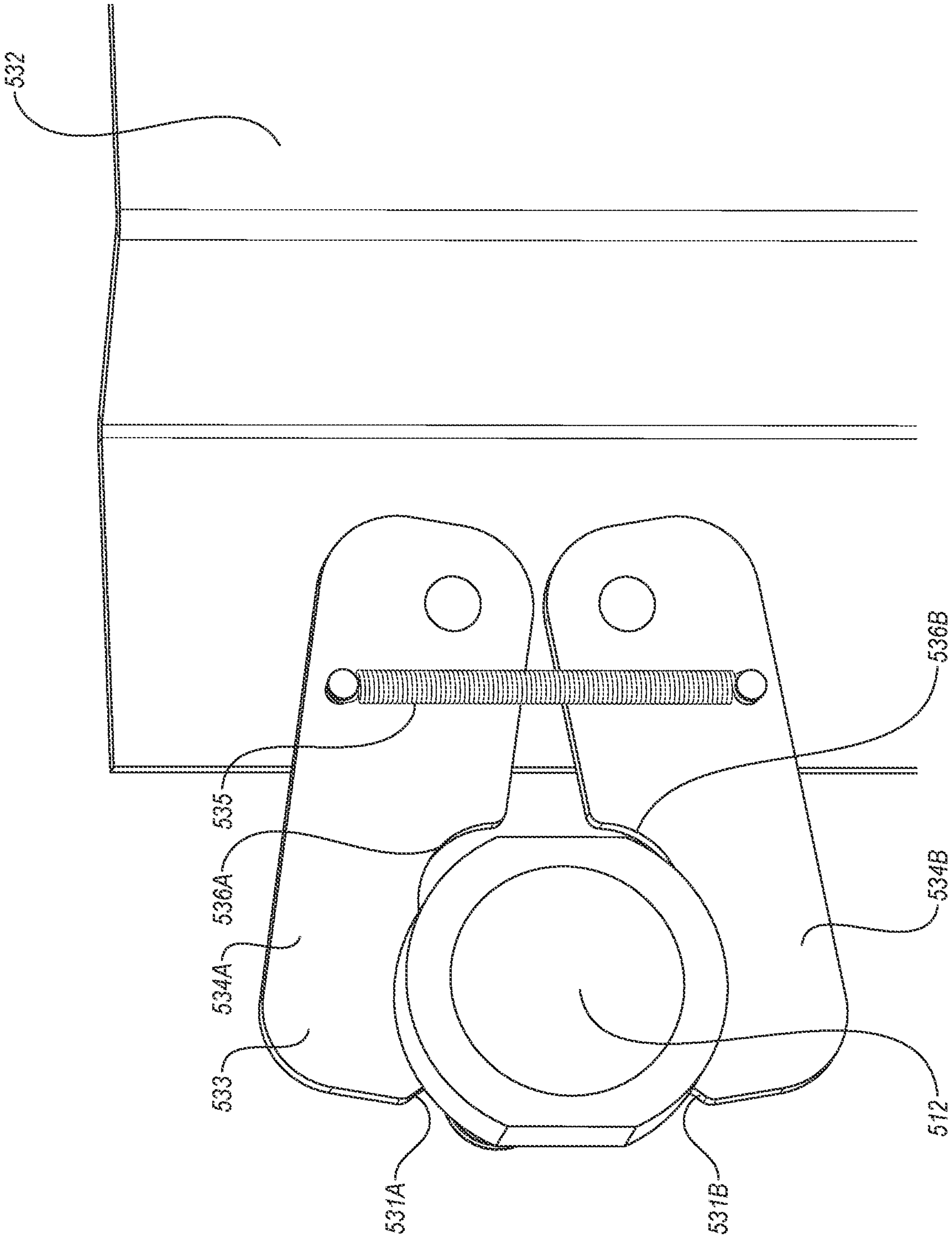
FIG. 14 is a perspective view showing one of the spring-loaded locking slots as it is being coupled with a fixed locking member.
Figure 15:
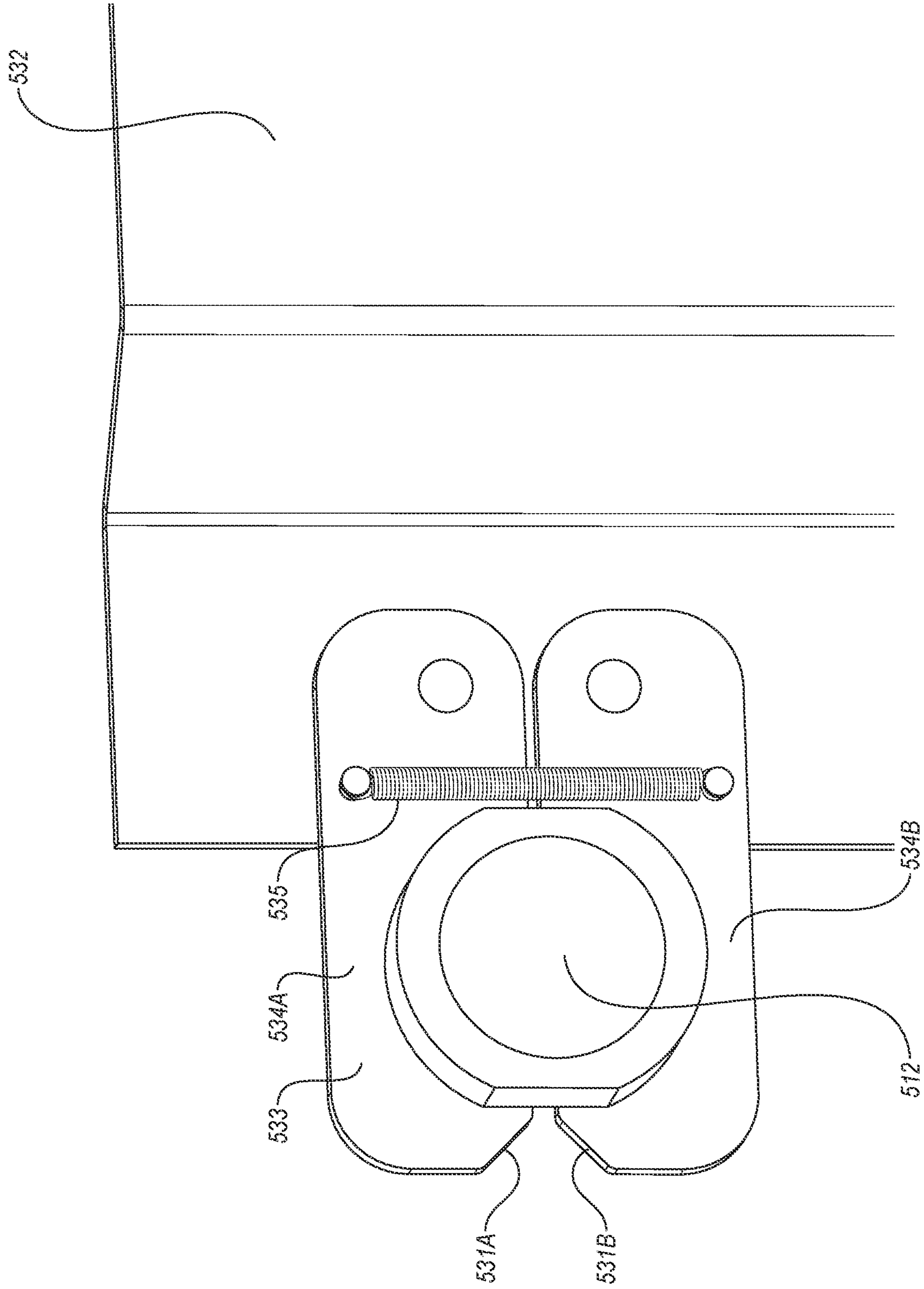
FIG. 15 is a perspective view of the spring-loaded locking slot of FIG. 14 after it has been fully coupled with the fixed locking member.

FIG. 13 is a perspective view showing an alternative actuation member 532 having a series of pivotable, spring-loaded locking tabs 533 that may be used in other safes or similar locking enclosures 500. FIGS. 14 and 15 depict one of the tabs 533 as it is being coupled with a locking stud 512. As best seen in these figures, locking tabs 533 each comprises a pair of pivotable pieces 534A/534B that are coupled together using a spring 535 to bias them in their closed positions. As those of ordinary skill in the art will appreciate, any other means for biasing other than a spring may be used in alternative embodiments.

Due to the leading end shapes of pivotable pieces 534A/534B, which include sloped surfaces 531A and 531B, respectively, the shaft portion of stud 512 forces the two pivotable pieces 534A/534B open, as shown in FIG. 14, after which they are automatically closed about the shaft portion of stud 512 when this portion of stud 512 enters the opposing, respective rounded cutouts 536A and 536B of pivotable pieces 534A and 534B.

Figure 16A:
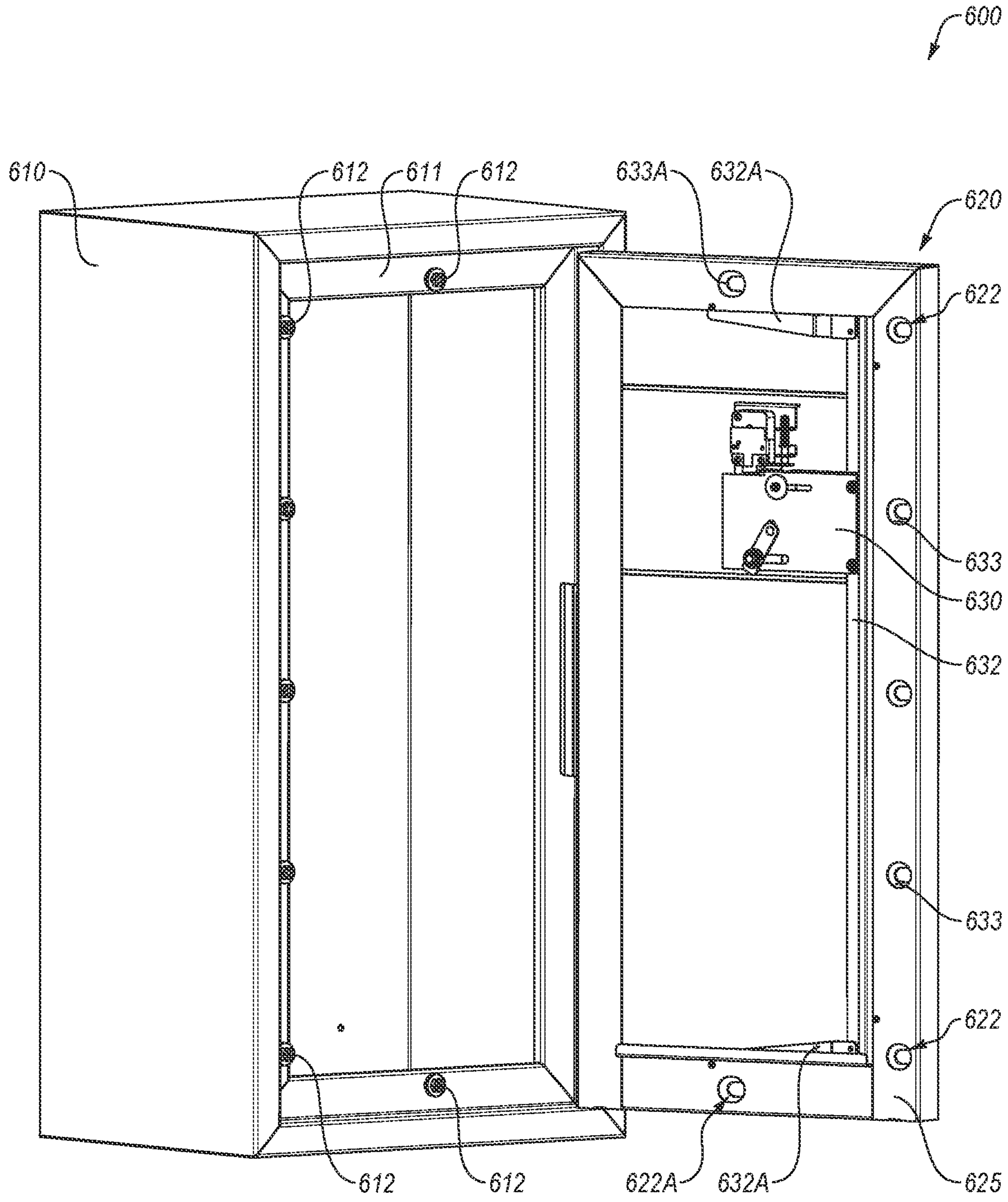
FIGS. 16A and 16B are perspective views of an alternative embodiment of a safe having an inset frame for the safe door.
Figure 16B:
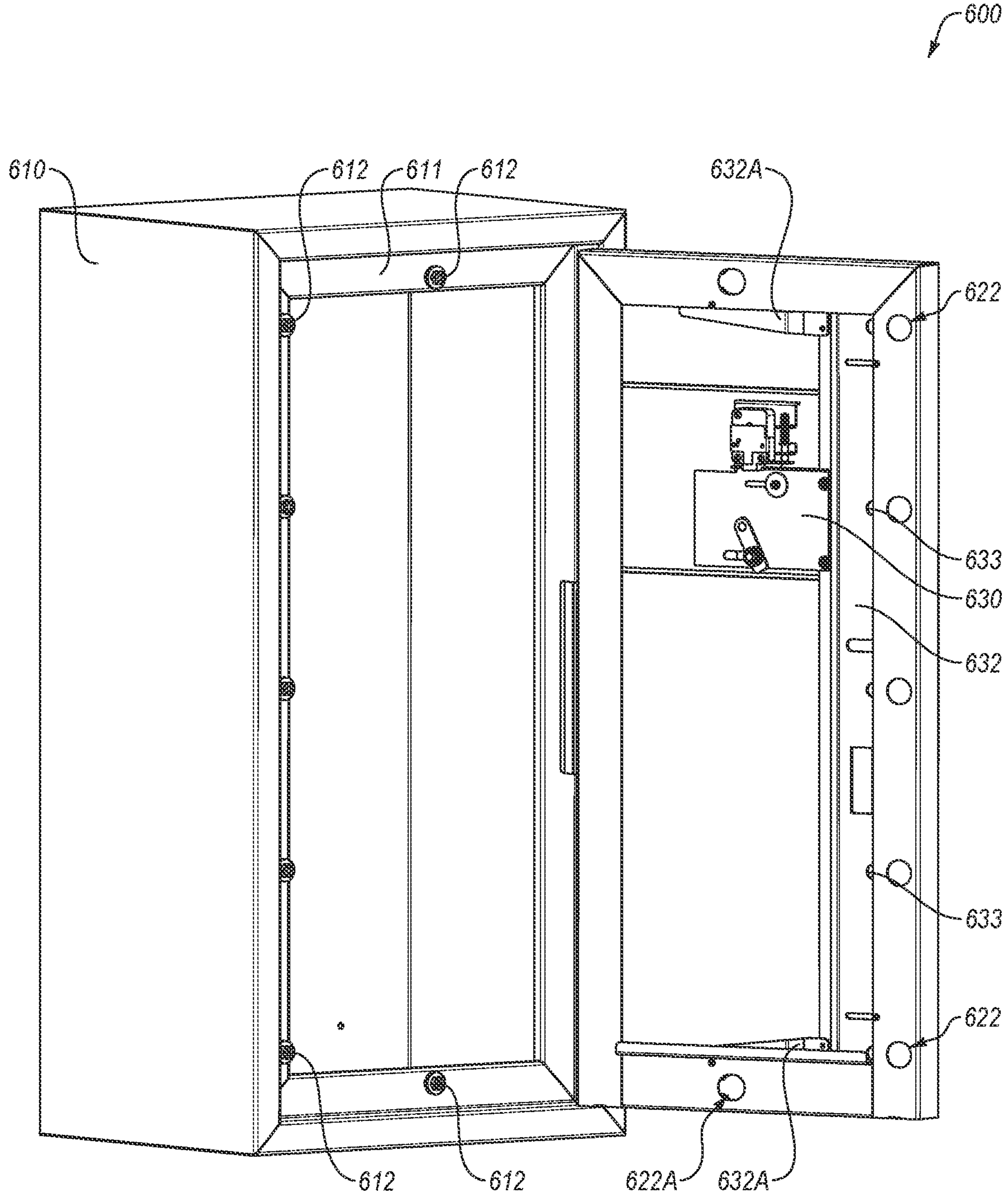

FIGS. 16A and 16B depict another alternative embodiment of another safe 600 comprising a door-mounted locking mechanism. Safe 600 again comprises a main body 610 and a door 620. Door 620 is shown in an open position in both of these figures and therefore the door locking actuation mechanism and corresponding actuator, such as a key lock, keypad, or the like and, for example, a crank handle, are not shown.

Safe body 610 comprises an inset or door frame region 611 that is inset from the perimeter of the body 610 in three dimensions, i.e., it is inset from the top, bottom, and opposing sides, and it is also inset from the front of the safe 600 to allow the safe door 620 to fully close without projecting beyond the proximal periphery (front face) of the outer frame of the body 610 itself. This framing of the door 620 provides several benefits. For example, once the safe door 620 has been closed, a would-be thief cannot insert a prying instrument, such as a crowbar, to apply forces in a direction that would normally be used to open the door 620. In other words, for a hinged door, this inset framing of the door prevents the non-hinged side of the safe body from being pried away from the non-hinged side of the door, which greatly improves security. However, it is contemplated that some embodiments may be configured such that the front of the door projects beyond the proximal periphery of the body.

In the embodiment depicted in FIGS. 16A and 16B, each of the locking members 612 is positioned within the inset/frame region 611 of safe body 610. As previously mentioned, locking members 612 may comprise, for example, studs having enlarged heads and/or washers or other features to provide an engagement surface for a corresponding, moveable element in the locking assembly positioned within the door 620. There are locking members 612 protruding from the side of inset/frame region 611 opposite from the door hinge, and additional locking members 612 positioned on both the upper and lower portions of the inset/frame region 611. Again, this provides enhanced protection from break-ins by, for example, ensuring that prying forces are directed against the inner door frame provided by this region 611 rather than directed in tension against the locking members 612 to open the safe door 620. Indeed, by providing an inset frame for the locking members 612 and/or door 620, prying may result in deformation of the door and/or frame, which may make it even more difficult to open the door by increasing the forces required to open the door relative to before such prying were attempted.

Each locking stud 612 is configured to pass through a respective opening 622, which may be formed in a fixed panel 625 extending along an inner surface of door 620 adjacent to the outer edge opposite from the hinged region of the door 620. Movement of a handle or other actuator results in the movement of actuation member 630, which in the depicted embodiment comprises a plate. Actuation member 630 is coupled with an elongated actuation member 632 that extends along the inner surface of the door 620 adjacent to the aforementioned openings 622. Additional upper and lower actuation members 632A may be coupled with actuation member 632 and may extend adjacent to openings 622A formed along respective panels along the upper and/or lower peripheries of door 620.

Each of the various actuation members 632/632A may comprise and/or be coupled with a respective slot and/or tab 633/633A. Each tab/slot 633/633A has an open end that is configured to translate with the movement of plate 630 to engage a respective locking stud 612. FIG. 16A depicts each of these tabs/slots 633/633A in a locked/engaged configuration (understanding that this would typically be done with door 620 closed rather than open, as shown in the figure) and FIG. 16B depicts them in an unlocked/disengaged configuration.

As previously mentioned, by sliding the slots 633/633A in engagement with the locking studs 612, in some cases with an opening 622 that allows the locking studs 612 to pass therethrough in the unlocked configuration, the door 620 can be securely locked in a closed position until the slots 633/633A have been moved in the opposite direction, as shown in FIG. 16B, to disengage the locking studs 612. It should also be apparent from these figures that the slots 633/633A do not, even in their locked/extended configuration, extend beyond the peripheral edge of the door 620, since the studs 612 are configured to extend within and be coupled with the door 620 even in an unlocked configuration, which may add additional security to certain embodiments.

Figure 17A:
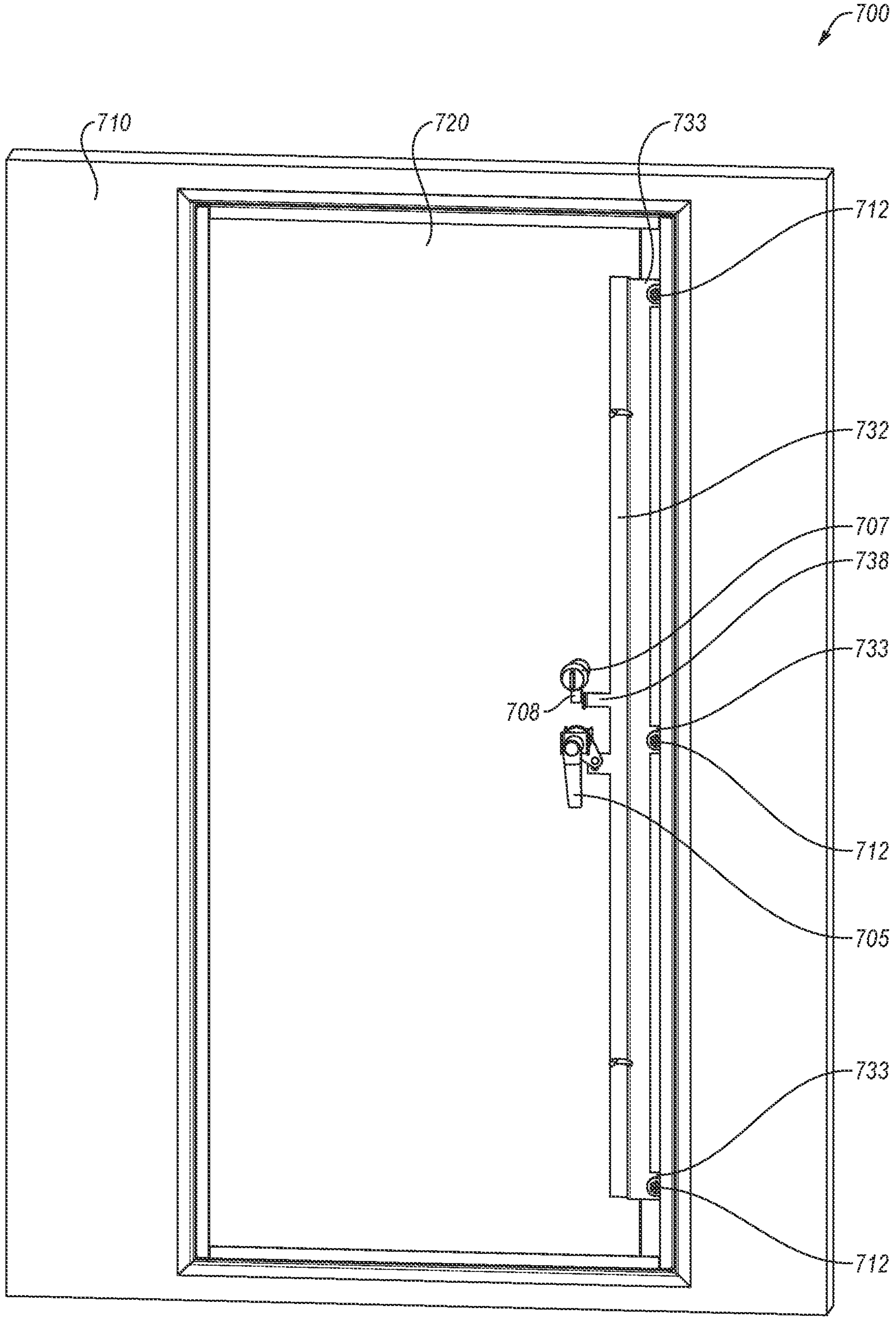
FIGS. 17A and 17B depict another alternative embodiment in which a locking mechanism has been incorporated into the door of a home or other building.
Figure 17B:
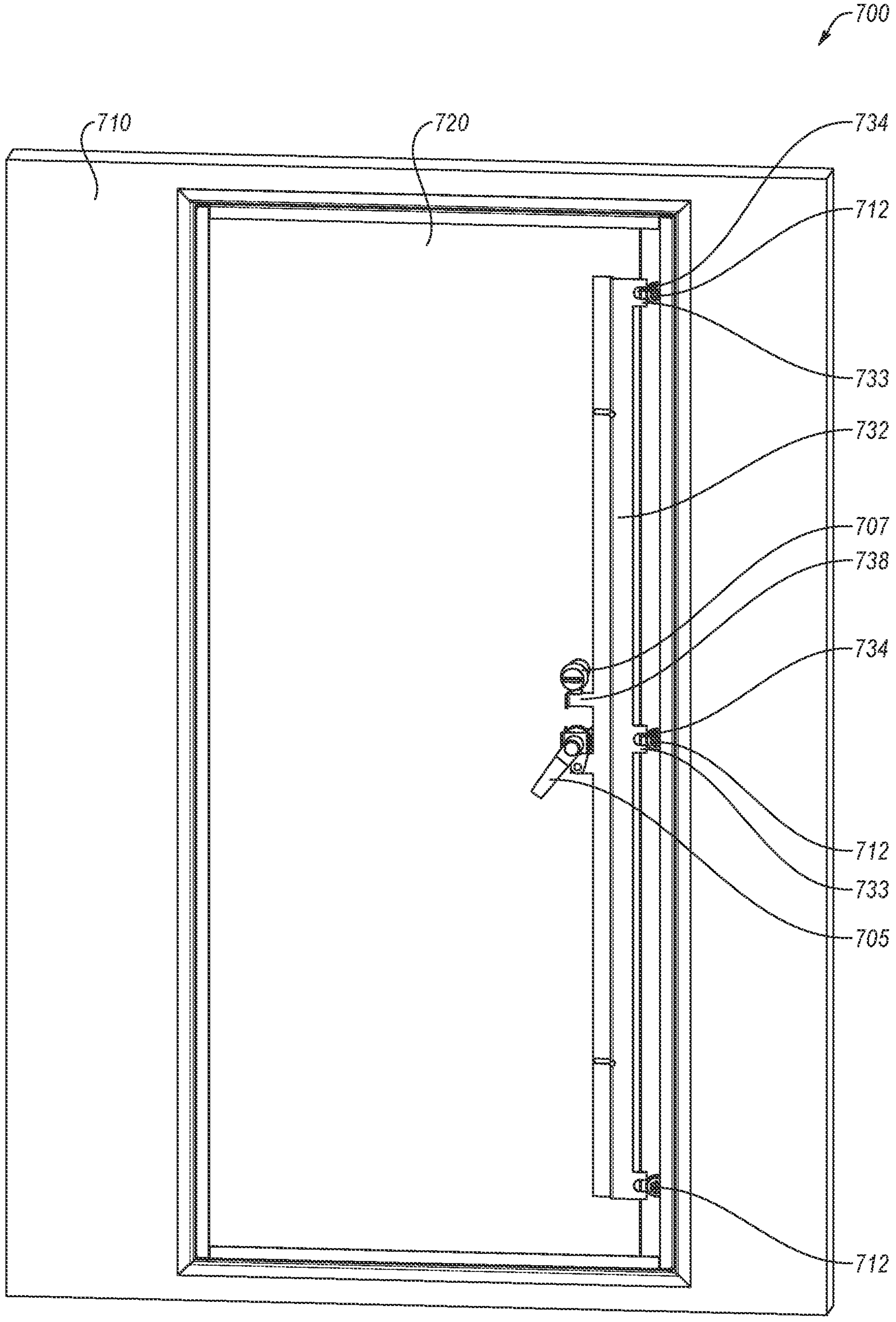

FIGS. 17A and 17B illustrate another alternative embodiment of a locking assembly 700, which, in this case comprises a locking mechanism incorporated into the door 720 of a home or other building. Door 720 is positioned within a door frame 710 and is shown in the figures in a closed position within the frame 710.

A series of fixed/mounted locking members or studs 712 are shown extending from an adjacent portion of door frame 710. In preferred embodiments, these studs 712 may be mounted to a portion of the door frame 710 that protrudes inward along the plane of the door (in the closed position) towards the center of the door more than a typical door jamb while still protruding inward in a direction orthogonal to the plane of the door. This may allow the slots 734 formed by protruding tabs 733 to extend towards and engage a respective stud 712 without extending beyond the perimeter of the door 720. However, in other contemplated embodiments, the studs 712 may extend from another portion of the door frame 710 and/or in another direction. Similarly, in some contemplated embodiments, the slots/tabs 734/733 may extend beyond the perimeter of the door frame in a locked configuration.

As with several other embodiments, the slots and/or tabs 734/733 may be coupled with an actuation member 732, which may, in turn, be coupled with an actuator, such as door handle 705 for providing the force to move the actuation member 732. As shown in FIGS. 17A and 17B, turning of door handle 705 in one direction may cause actuation member/bar 732 to move to the right, which causes slots 734 of tabs 733 to move to the right to engage a corresponding stud 712 (when the door 720 is closed). Similarly, turning of door handle 705 in the opposite direction may result in movement of actuation member/bar 732 to the left, which causes slots 734 of tabs 733 to move to the left to disengage from a corresponding stud 712 (again, when the door 720 is closed) so that the door 720 can be opened.

Of course, a wide variety of alternative embodiments are contemplated. For example, door handle 705 may be configured to result in movement of member/bar 732 in the same direction (either towards a locked or unlocked configuration) when rotated in either direction, similar to the way a typical door handle retracts a door latch irrespective of which direction the handle is rotated. Some embodiments may further comprise an interlock, which may be integrated into the locking mechanism such that, when the door is in its closed position, tension from a biasing member, such as a spring, may be used to provide the force to move the member/bar 732 into its locked position automatically.

In some embodiments, an alternative actuator, such as a locking knob or dial, may be used, which in some cases may be separate from the primary handle of the door. For example, a typical door handle may be used and a separate actuator, which may be another handle or any other suitable dial, handle, knob, switch, or other actuator, may be used to actuate the locking mechanism depicted in the figures.

Some embodiments may further comprise a locking element/assembly that is configured to lock the mechanism more securely in place following coupling of the moveable elements of the locking assembly 700 to the fixed elements (studs 712) of the locking assembly 700. In the depicted embodiment, this locking assembly comprises a rotatable locking actuator/dial 707, which may be similar in function to a deadbolt lock. Rotation of actuator 707 results in advancement or retraction of a bolt 708 or another protruding member. Similar to a deadbolt lock, this assembly may be configured, in some embodiments, with a manually rotatable thumb turn or the like on one side and a keyed lock on the opposite end to allow building occupants to lock the door from the inside and allow those with a key to unlock the door from the outside. Of course, some embodiments may be configured without any feature for unlocking the door from the outside, if desired. Similarly, other embodiments are contemplated in which actuator 707 is replaced with an electronically actuatable assembly, or with any other manual actuator available to those of ordinary skill in the art.

Unlike a typical deadbolt, the bolt 708 of actuator 707 is configured to extend only internally (down, from the perspective of the depicted embodiment) relative to door 720 rather than beyond the door 720 to engage a slot in a door frame. In particular, in a locked configuration, bolt 708 is configured to extend so as to block a portion of the member/bar 732 from being able to retract to an unlocked configuration. This locked configuration is shown in FIG. 17A. In the depicted embodiment, this portion comprises a protruding extension 738 of member/bar 732, which extends in the opposite direction relative to the various slots 734 and tabs 733.

FIG. 17B depicts an unlocked configuration. In this configuration, the bolt 708 has been retracted, thereby allowing the protruding extension 738 to extend by the retracted bolt 708 and, consequently, the various slots 734 to disengage from their respective studs 712 to allow the door 720 to be opened. Again, a wide variety of alternative features and elements may be used in alternative embodiments to maintain the locking assembly 700 in a locked configuration.

It should be understood that, with respect to locking mechanisms used on homes or other buildings, such as office buildings, businesses, and the like, handles/actuators would typically be provided on both sides. In addition, because many such doors are inswing doors, the studs or other fixed locking members will typically protrude towards the interior of the building, such as, for example, from an inset frame as discussed above.

Figure 18A:
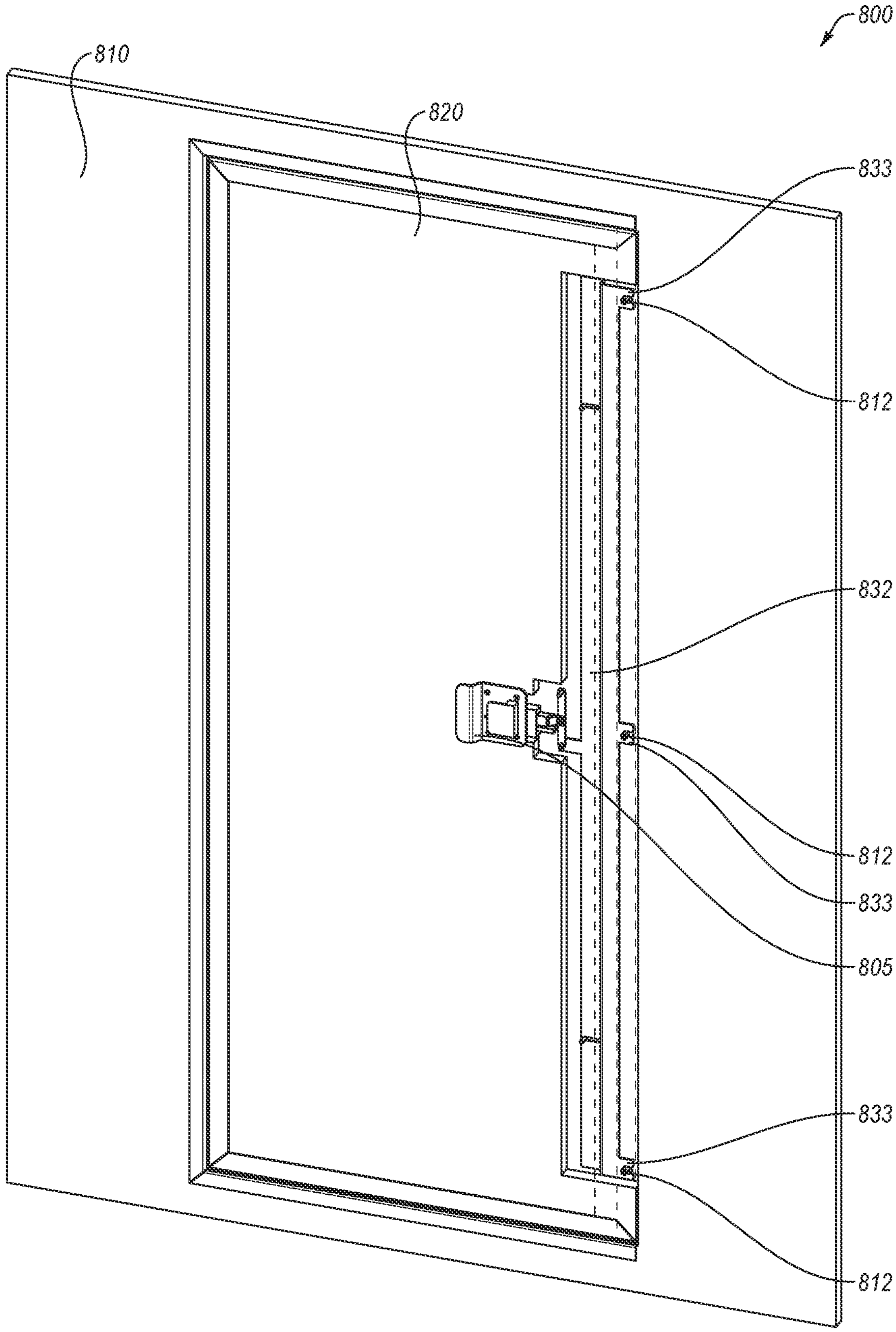
FIGS. 18A and 18B depict still another alternative embodiment in which a locking mechanism has been incorporated into the door of a vehicle, such as a motorhome or enclosed trailer.
Figure 18B:
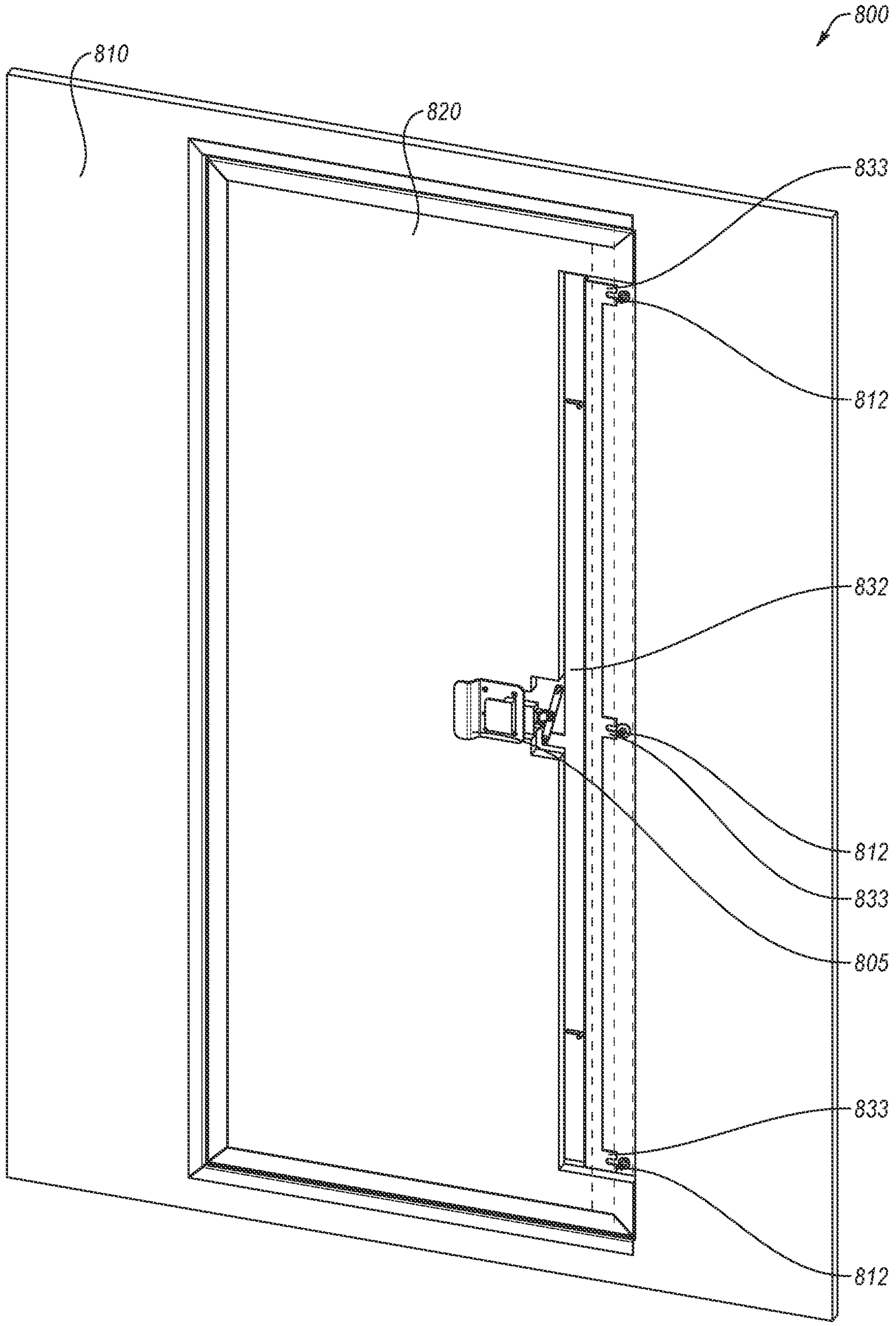

Still another embodiment of a locking assembly 800 is depicted in FIGS. 18A and 18B. In this case, the locking assembly 800 again comprises a door 820 that is positioned within a door frame 810. However, in this embodiment, door 820 may be more suitable for use in connection with, for example, a motorhome, recreational vehicle, and/or enclosed trailer. Again, the assembly 800 is depicted in a locked configuration in FIG. 18A and an unlocked configuration in FIG. 18B.

One or more studs 812 or other fixed locking members may be positioned to extend from a portion of the adjacent frame 810. As previously mentioned, in preferred embodiments, frame 810 may comprise an extended door jamb or other protruding and/or inset feature (protruding from the side and inset from the front) configured to engage the outer surface of a portion of the periphery of the door 820 opposite the hinged side so that the door 820 can be made flush with the surrounding surfaces of the door frame 810. In addition, preferably the studs 812 extend from this inset/recessed region such that the locking mechanism of the door 820 can engage and disengage the studs 812 without extending beyond the peripheral edges of the door 820, as previously discussed.

As also previously discussed, the locking assembly may comprise an actuator 805, which in this case comprises a sliding door handle. Of course, any other actuator disclosed herein or otherwise available to those of ordinary skill in the art may be used. For example, a rotating lever plate may be used, which may be similar to those used in some RV doors. Movement of handle/actuator 805 causes corresponding movement of actuation member/bar 832, which causes tabs 833, which may each comprise a slot, as previously discussed, to move to the right to engage a corresponding stud 812 (when the door 820 is closed). Similarly, sliding of door handle 805 in the opposite direction causes actuation member/bar 832 to move to the left, which causes these tabs 833 and their corresponding slots to move to the left to disengage from a corresponding stud 812 so that the door 820 can be opened.

Figure 19A:
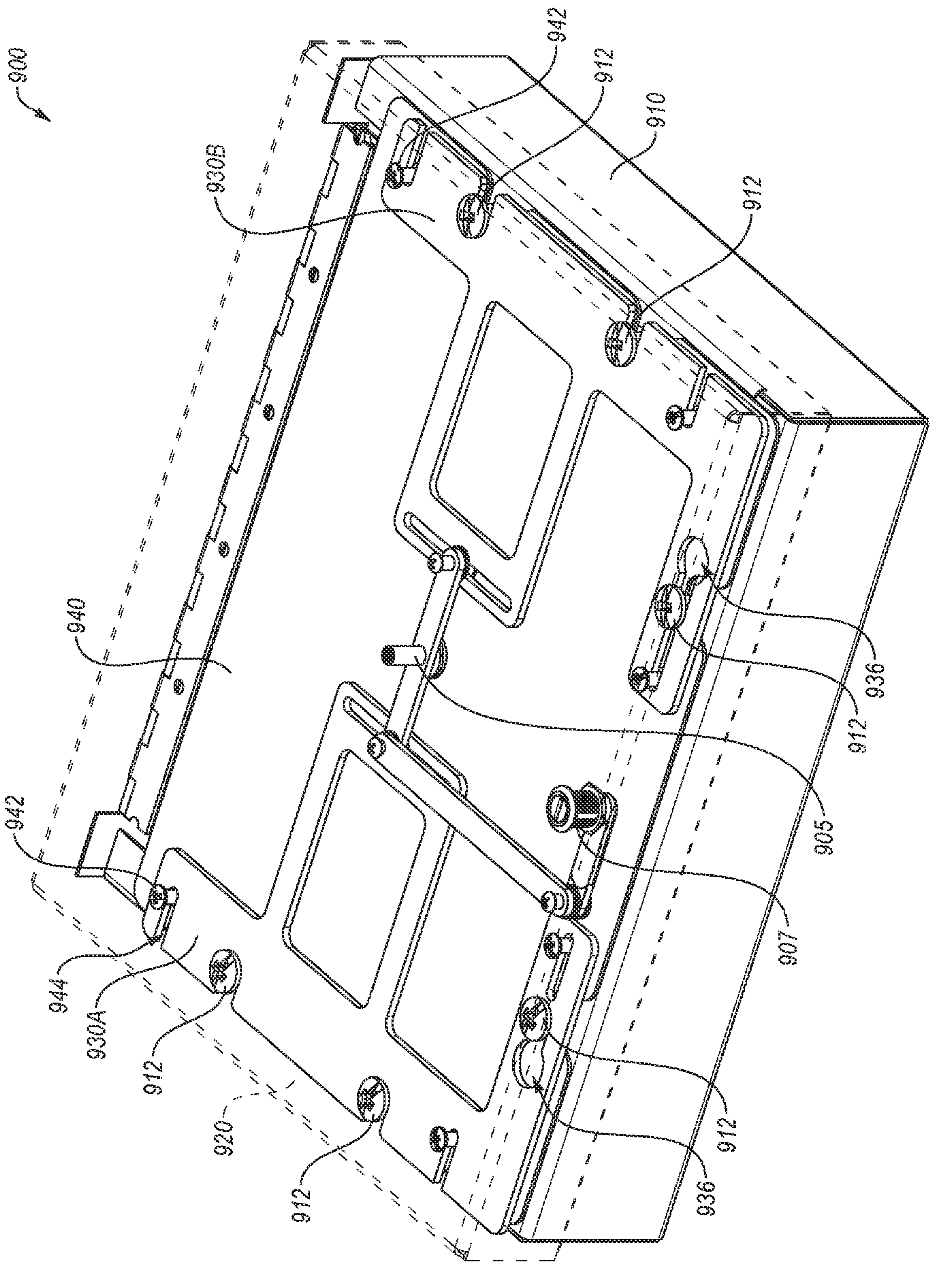
FIGS. 19A and 19B depict yet another alternative embodiment comprising a lock box, such as a pistol box.
Figure 19B:
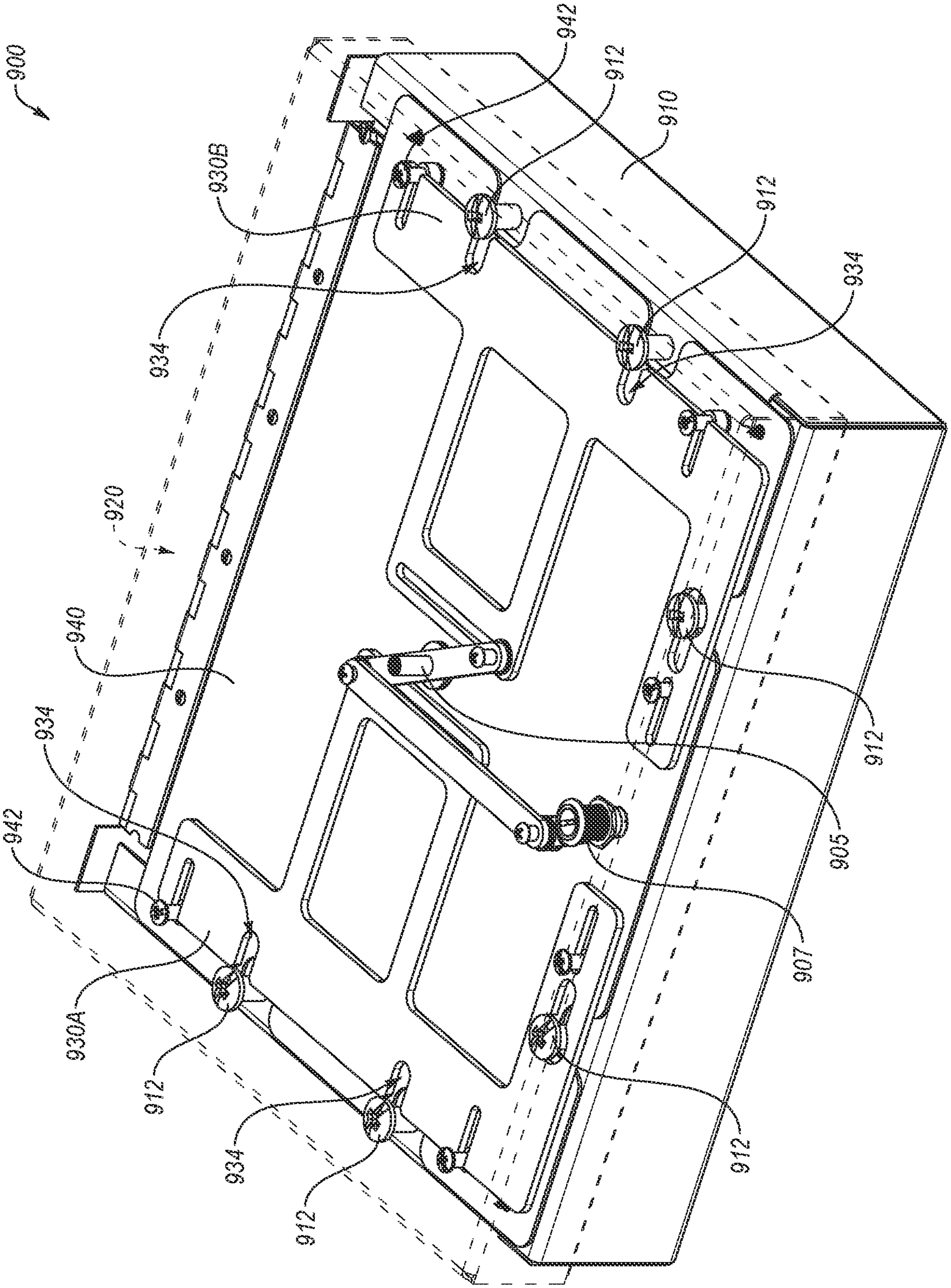

Yet another embodiment is depicted in FIGS. 19A and 19B. In this embodiment, a locking box 900 is depicted, which may, for example, be used as a locking pistol box. Of course, the box 900 may comprise any type of box or enclosure and the associated locking mechanism may be used to lock any other type of enclosure, such as a locker, key box, cash box, prescription drug cabinet/box or another type of cabinet, and the like. The variety of embodiments spanning from safes to building/home doors to portable lock boxes illustrates the breadth of applications available using the principles, features, and components disclosed herein. Indeed, these principles may allow for more securely locking any structure comprising a door, lid, cover, or the like that can be pivotably or otherwise closed to secure the inside of the structure by engaging, for example, fixed protruding locking members extending from a periphery of a frame of the door/lid/cover using a movable locking mechanism incorporated into the door/lid/cover.

In the case of locking box 900, a lid 920 is present but shown in phantom to illustrate the locking mechanism components incorporated into the lid 920. A series of protruding locking members comprising studs or bolts 912 are positioned about a frame or body 910 of the box 900. Because these locking members 912 are inaccessible when the lid 920 is closed, they may be threadably coupled with the body 910, although they need not be in all contemplated embodiments.

As with several of the embodiments previously discussed, an actuation member may be used to provide and/or transfer (as discussed herein, typically although not necessarily generated by another component of the assembly) the force by which slots are engaged with locking members 912. However, in the embodiment of FIGS. 19A and 19B, there are two such actuation members, namely, a first actuation member 930A, which is positioned on the left side of the assembly from the perspective of these figures, and a second actuation member 930B, which is positioned on the right side of the assembly from this perspective. Each of these actuation members 930A/930B comprises a series of plates and/or bars that allow them to extend towards opposite ends of the locking assembly and couple with other, articulating portions of the assembly.

For example, an actuator rod 905 is coupled to one or more rotatable/pivoting bars. Actuator rod 905 may extend through the lid 920 to allow for access by a user to, for example, a knob, handle, or the like, which may allow for transferring rotational force to the pivoting bars and, ultimately, moving the opposing actuation members/plates 930A/930B towards and away from the opposing sides of the box 900/body 910. In some embodiments, a torque-limiting clutch and/or shear mechanism, both of which are mentioned above, may be used in order to prevent excessive force from reaching the lock.

A series of slots 934 are formed directly in actuation members 930A/930B in this embodiment. As these actuation members 930A/930B move from the position depicted in FIG. 19B (unlocked) to the position depicted in FIG. 19A (locked), slots 934 slide under the enlarged portions (enlarged heads in this case) of locking members 912. Given that the size of slots 934 is sufficient to receive the shafts of locking members 912 but less that the diameter of the heads of locking members 912, this locks the lid 920 in a closed position. It should be understood that, although circular heads are used in the depicted embodiment, this need not be the case for all embodiments. Indeed, for heads or other enlarged features of a locking member that are non-circular, so long as these enlarged features are larger in at least one dimension that is mis-aligned with the corresponding slot, such feature should provide a suitable locking function.

Some of the locking members 912 may be positioned along other sides of the lid 920. For example, in the depicted embodiment of FIGS. 19A and 19B, there are two locking members 912 that extend from a portion of the peripheral frame of body 910 opposite from the hinged portion of lid 920. With respect to these two locking members 912, corresponding slots 936 are formed in respective extensions of actuation members 930A/930B that comprise two distinct sections, namely, an enlarged section configured to allow for passage of an enlarged portion of a respective locking member 912 and an elongated section having a smaller cross-sectional width, which may be similar in this respect/dimension to the side slots 934, in order to engage the enlarged head or other portion of the locking member 912 to provide additional security to prevent opening of the lid 920.

Additional slots and corresponding bolts, studs, or other fasteners may be used to couple the locking assembly of box 900 to the lid 920. For example, in the depicted embodiment, a series of additional bolts 942 or other locking members may be coupled to a base plate 940 of lid 920. Base plate 940 comprises a series of cut-outs configured to receive the locking bolts 912 and each bolt 942 is configured to allow the locking mechanism to be coupled with the base plate 940, due to an enlarged head that prevents each bolt 942 from passing through its corresponding slot 944, while also allowing for the aforementioned movement of actuation members 930A/930B between the locked and unlocked configurations.

A lock or locking actuator 907 may also be provided. Lock 907 may comprise a key-lock, a combination lock, an electronic lock, or any other suitable lock. This lock may, as shown in FIGS. 19A and 19B, extend from the locking mechanisms incorporated into the lid 920 through to the outer surface of the lid 920 so as to be accessible by a user. Lock 907 may be configured to prevent movement of one or more of the articulating or other moveable components in the locking mechanism. In some embodiments, lock 907 may also serve as the actuator, which may negate the need for a separate actuator 905. For example, in some embodiments, a keyed rotation of lock 907 may first unlock the box 900, after which further rotation of the lock 907 may be used to generate the forces needed to advance the actuation members 930A/930B towards their respective locking members 912. As those of ordinary skill in the art will appreciate, however, elements 905 and/or 907 may be replaced by electronic locks and/or actuators, which may allow, for example, a user to input an electronic code that, once input correctly, will automatically move the actuation members 930A/930B to an unlocked configuration so that the lid 920 may be opened. Similar electronic mechanisms may be used for any of the embodiments disclosed herein.

Figure 20A:
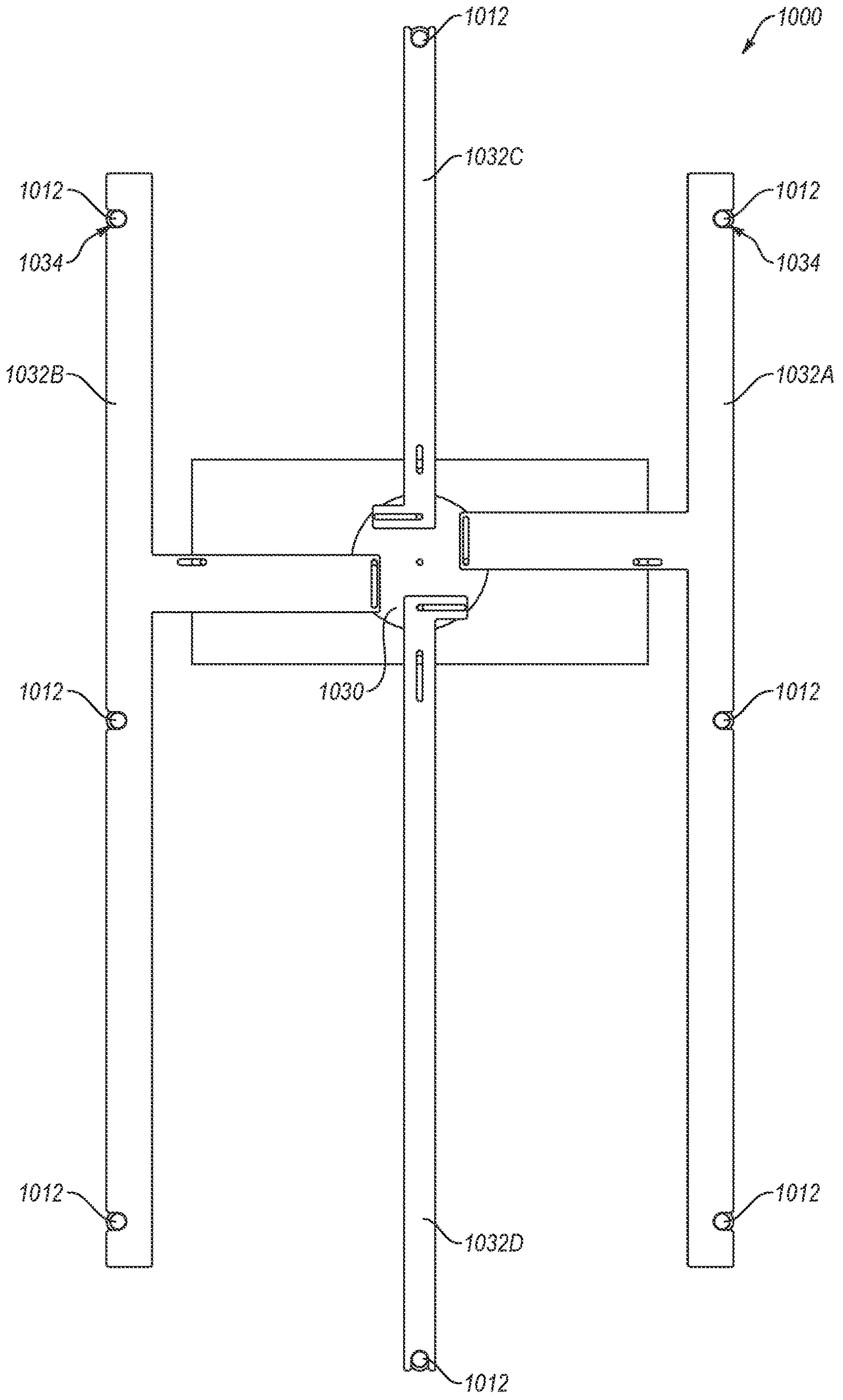
FIGS. 20A and 20B depict still another embodiment of a locking mechanism/assembly comprising a series of actuation members configured to engage locking members in two opposing horizontal and two opposing vertical directions.
Figure 20B:
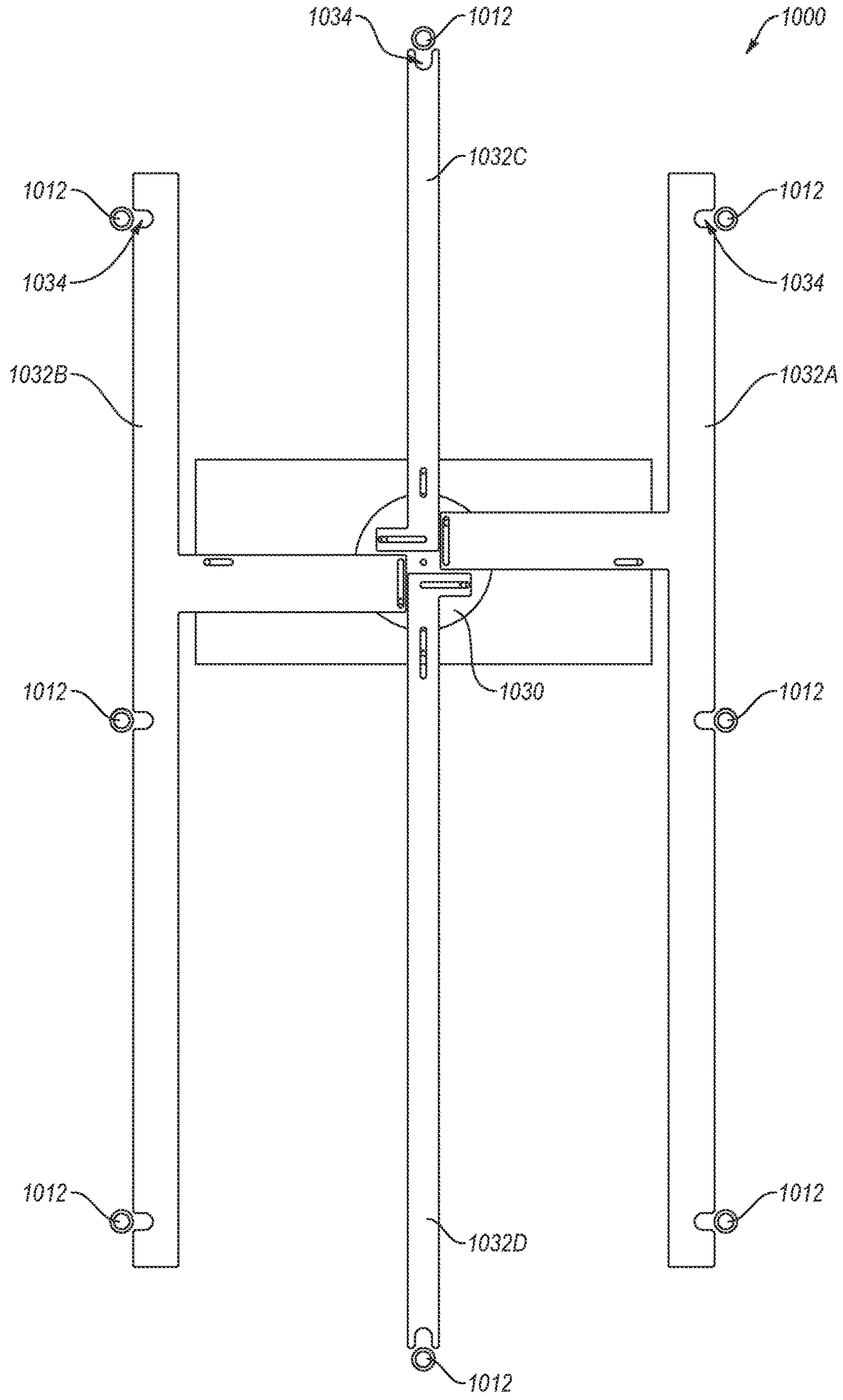

FIGS. 20A and 20B depict another embodiment of a locking mechanism/assembly 1000. FIG. 20A depicts this assembly 1000 in its locked configuration and FIG. 20B in its unlocked configuration. Although no door or lid is shown in these figures, it should be understood that, as discussed throughout this disclosure, the actuator/actuation plate 1030 and its associated actuation members 1032A-1032D would typically be incorporated into the door/lid, such as within a frame defining the door/lid, but the door/lid is not shown in these figures for the sake of simplicity and to avoid obscuring the features being disclosed in these figures.

Similarly, each of the locking members 1012 is not shown coupled to anything in the figures, but it should be understood that, as previously discussed, these locking members 1012, which, again, may comprise locking studs, bolts, or the like, preferably with an enlarged head or another enlarged portion, such as a washer, would typically be fixedly mounted to an adjacent door frame or the like. Again, this is not shown for simplicity's sake.

As can be seen in FIGS. 20A and 20B, the various actuators are configured to engage a plurality of slots 1034 with a respective locking member 1012. More particularly, there are two rows of vertical locking members 1012 on either side of the actuator/actuation plate 1030 and there are additional locking members 1012 above and below the actuator/actuation plate 1030. Of course, additional locking members 1012 may be formed in rows along the top or bottom, if desired.

Rotation of the actuation plate 1030—which, as mentioned above, may be accomplished in any number of ways, including but not limited to rotation of a crank handle following a successful unlocking process—may simultaneously result in lateral movement of the two lateral actuation members 1032A and 1032B and vertical movement of the two vertical actuation members 1032C and 1032D. In this manner, a secure locking of an enclosure, such as a safe, box, building, vehicle, etc., may be accomplished by placement of locking studs or other locking members at any position about the periphery of the door/lid of the enclosure.

FIGS. 21A-21D are perspective views of yet another embodiment of a locking mechanism/assembly 1100. In these figures, a door 1120 is shown hingedly coupled with an inset door frame 1111. Inset door frame 1111 is positioned internally and inset in three dimensions relative to an outer frame 1110, which may be a frame of a building or other enclosure. As described throughout this disclosure, a plurality of locking members 1112 are mounted about the periphery of the inset frame 1111 (note that the surface to which they are mounted is not visible in these figures to allow for viewing the assembly from within the enclosure/safe). An actuation plate 1130 or another suitable actuator may be configured to move one or more actuation members 1132A/1132B/1132C to engage slots 1134A/1134B (the slot associated with actuation member 1132C is not visible in these figures) with respective locking members 1112. Various openings 1133 may be formed along the periphery of the door 1120, if desired, through which the locking members 1112 may extend in the closed configuration to allow the door 1120 to fully close within the inset frame 1111.

Figure 21A:
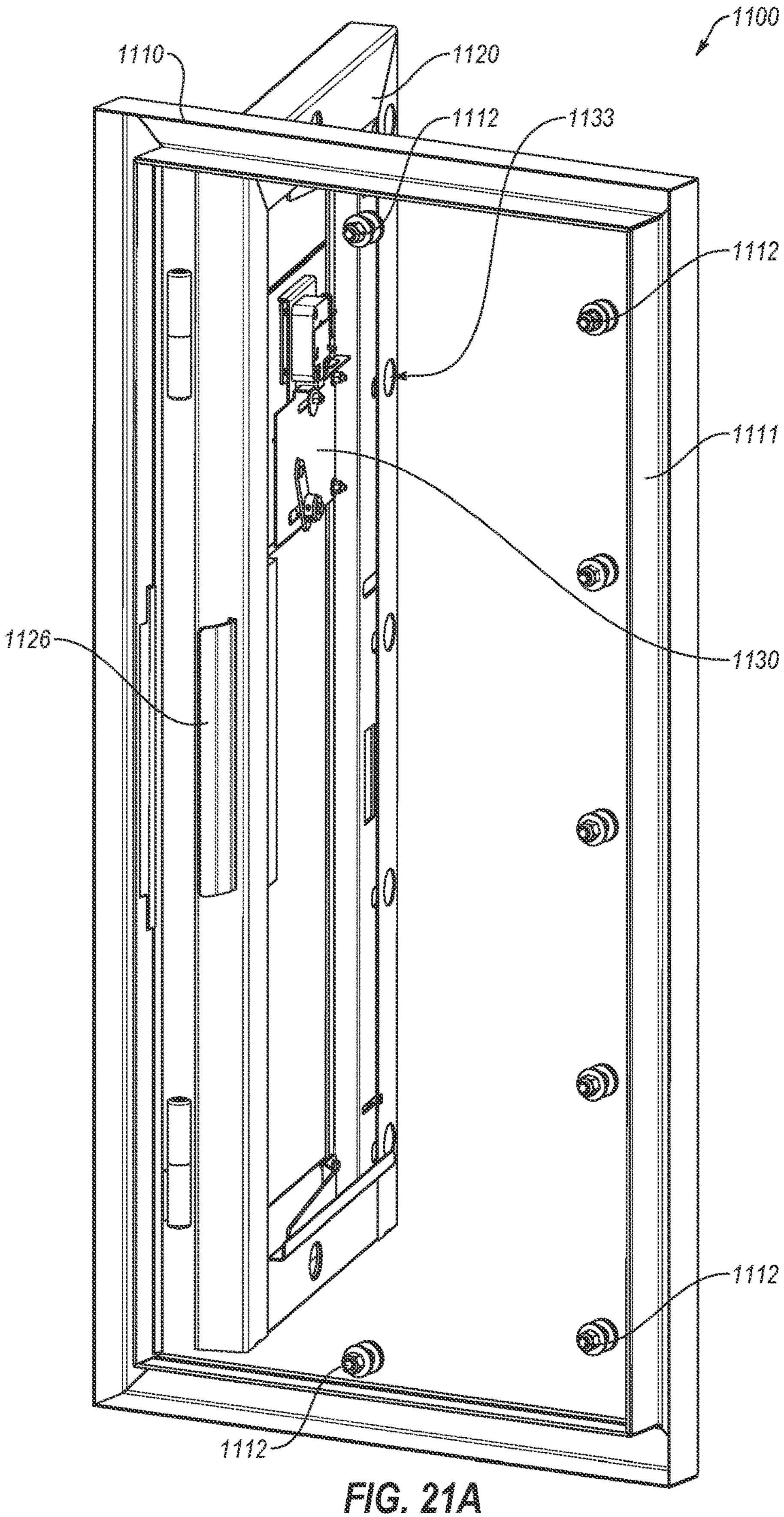
FIGS. 21A-21D depict an additional embodiment of a locking mechanism/assembly for an inset door further comprising a locking flange.
Figure 21B:
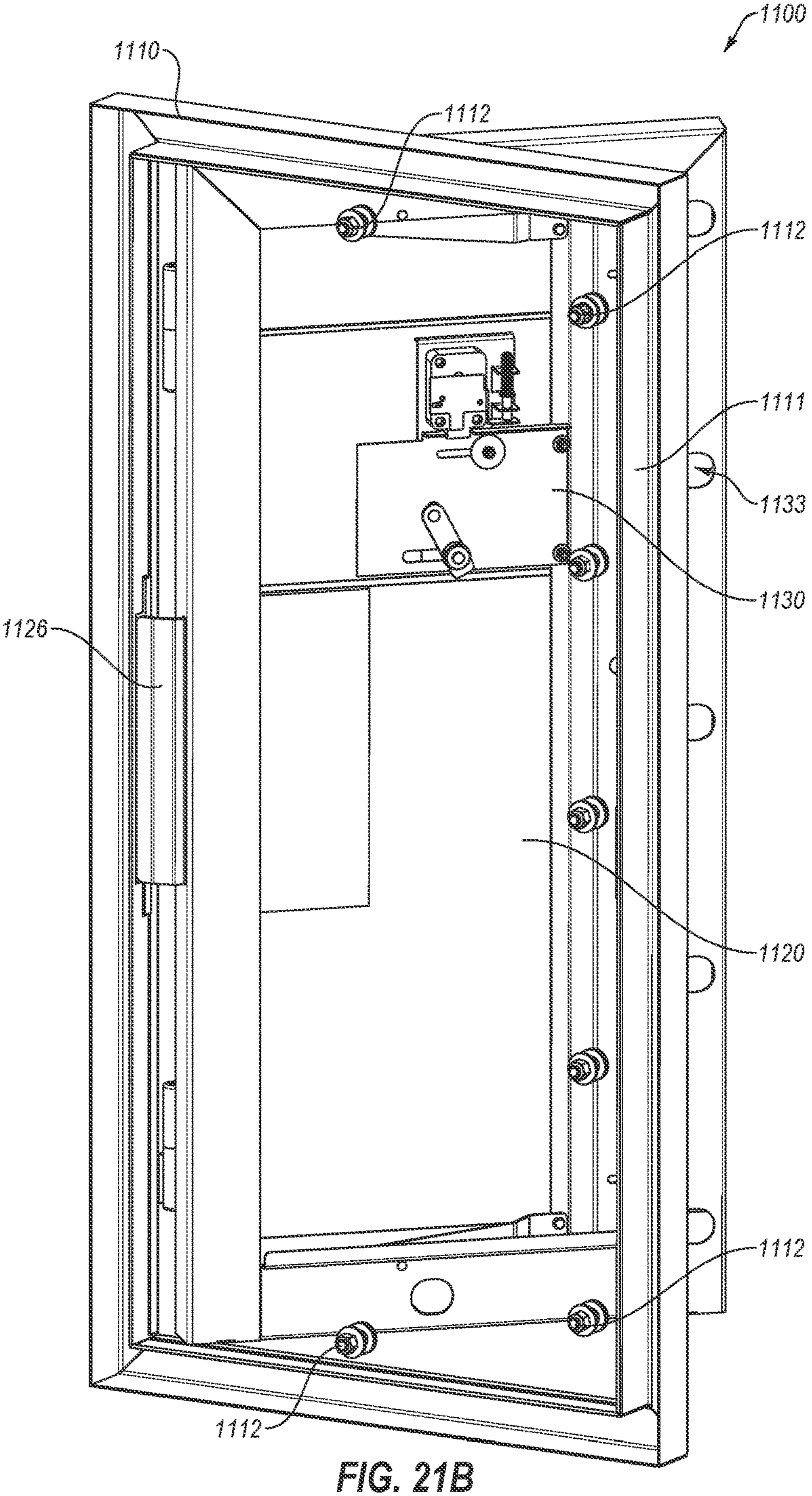
Figure 21C:
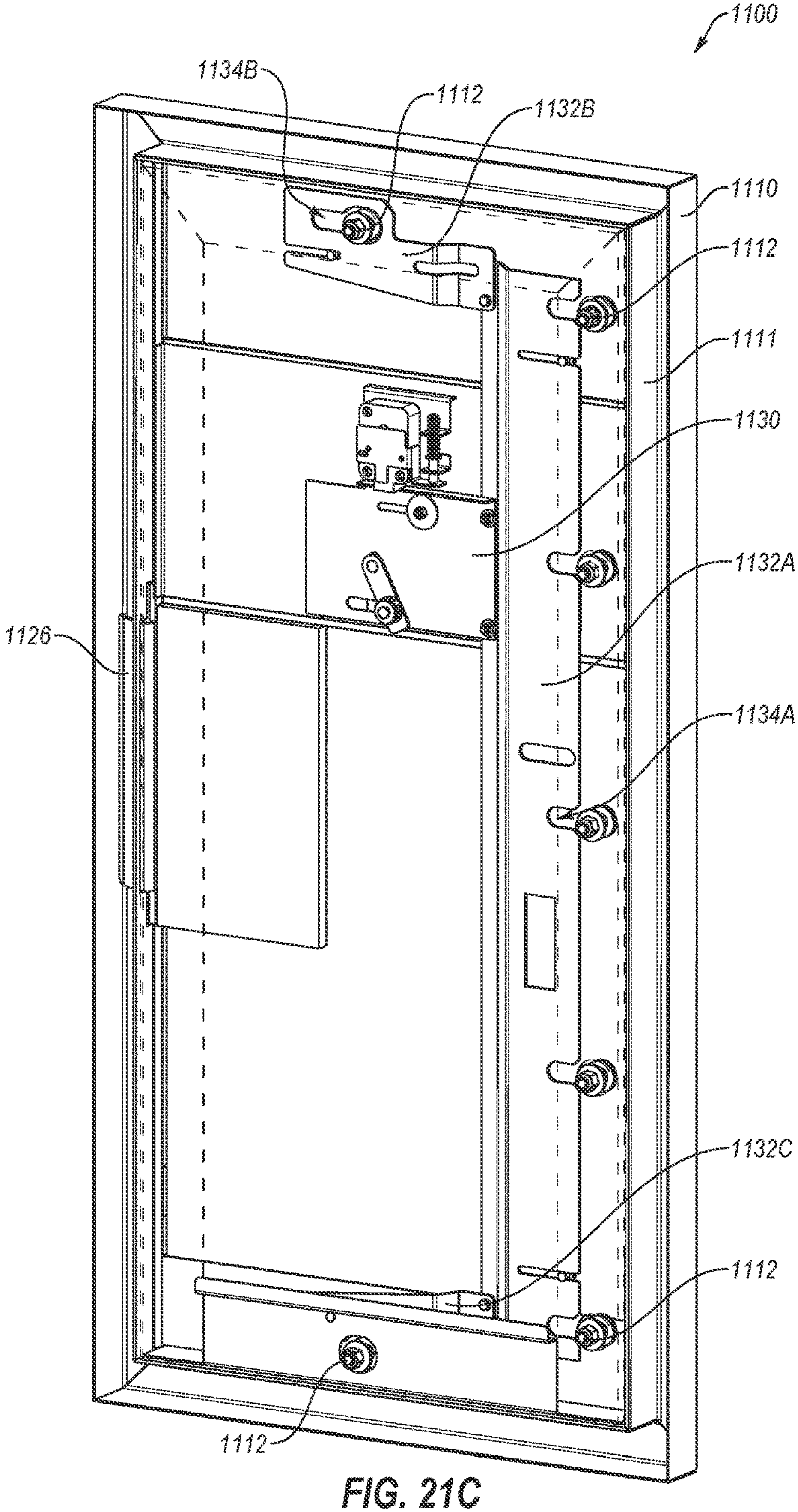
Figure 21D:
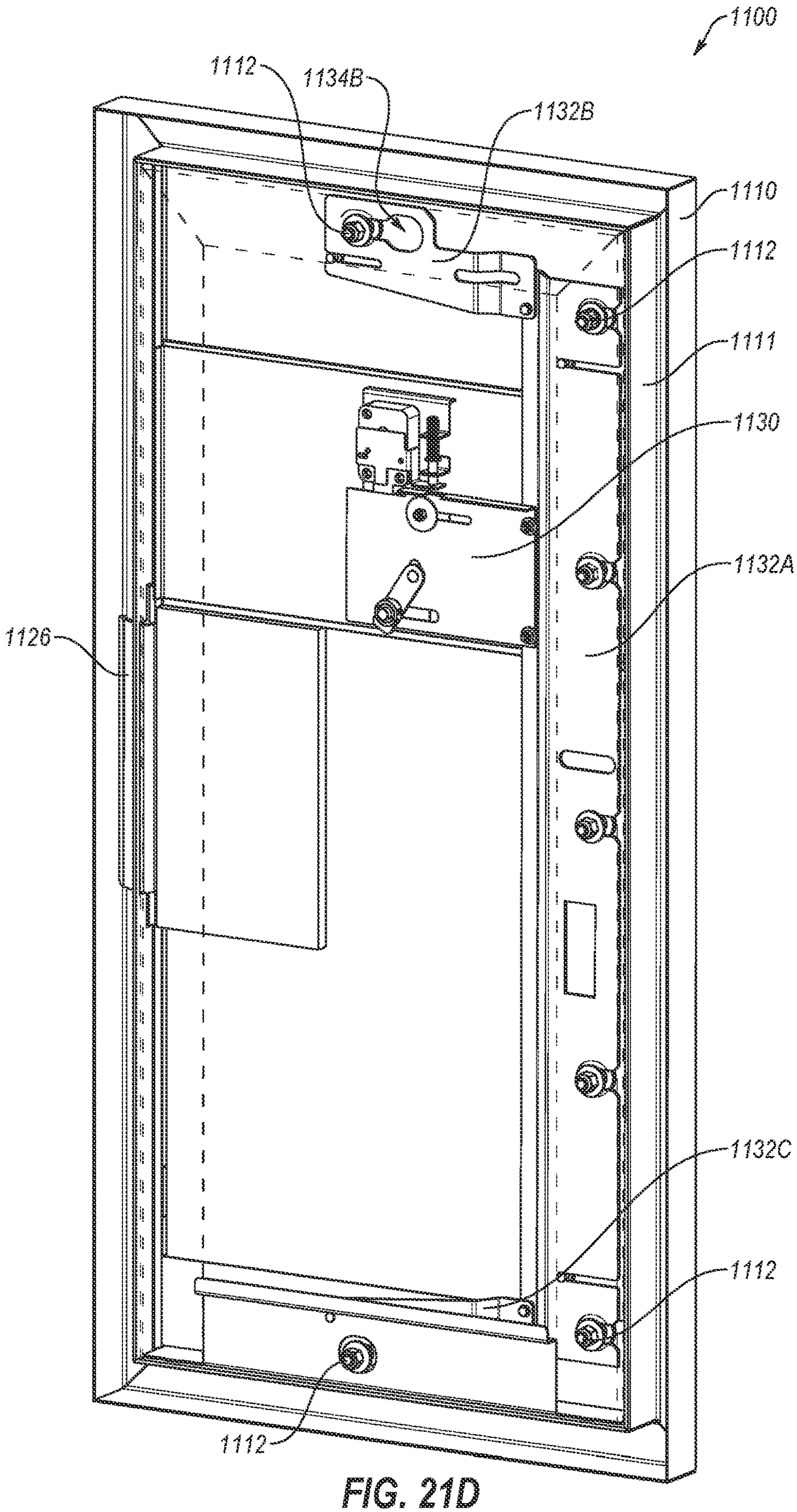

As shown in FIGS. 21C and 21D, some of the slots, such as slots 1134A, may comprise open-ended slots and others, such as slot 1134B, may comprise closed slots having an enlarged section configured to receive a respective locking member 1112. Upon full locking actuation, as shown in FIG. 21D, the enlarged section of slot 1134B may be moved away from the adjacent locking member 1112 such that the narrower portion of the slot 1134B engages the enlarged portion of the locking member 1112 to prevent, or at least inhibit, the door 1120 from being opened.

Locking assembly 1100 further comprises a locking flange 1126, which may provide further security to the associated enclosure. Although locking flange 1126 is shown in each of FIGS. 21A-21D, it is better seen in the close-up view of FIG. 21E, along with the cross-sectional views of FIGS. 22A and 22B.

Figure 21E:
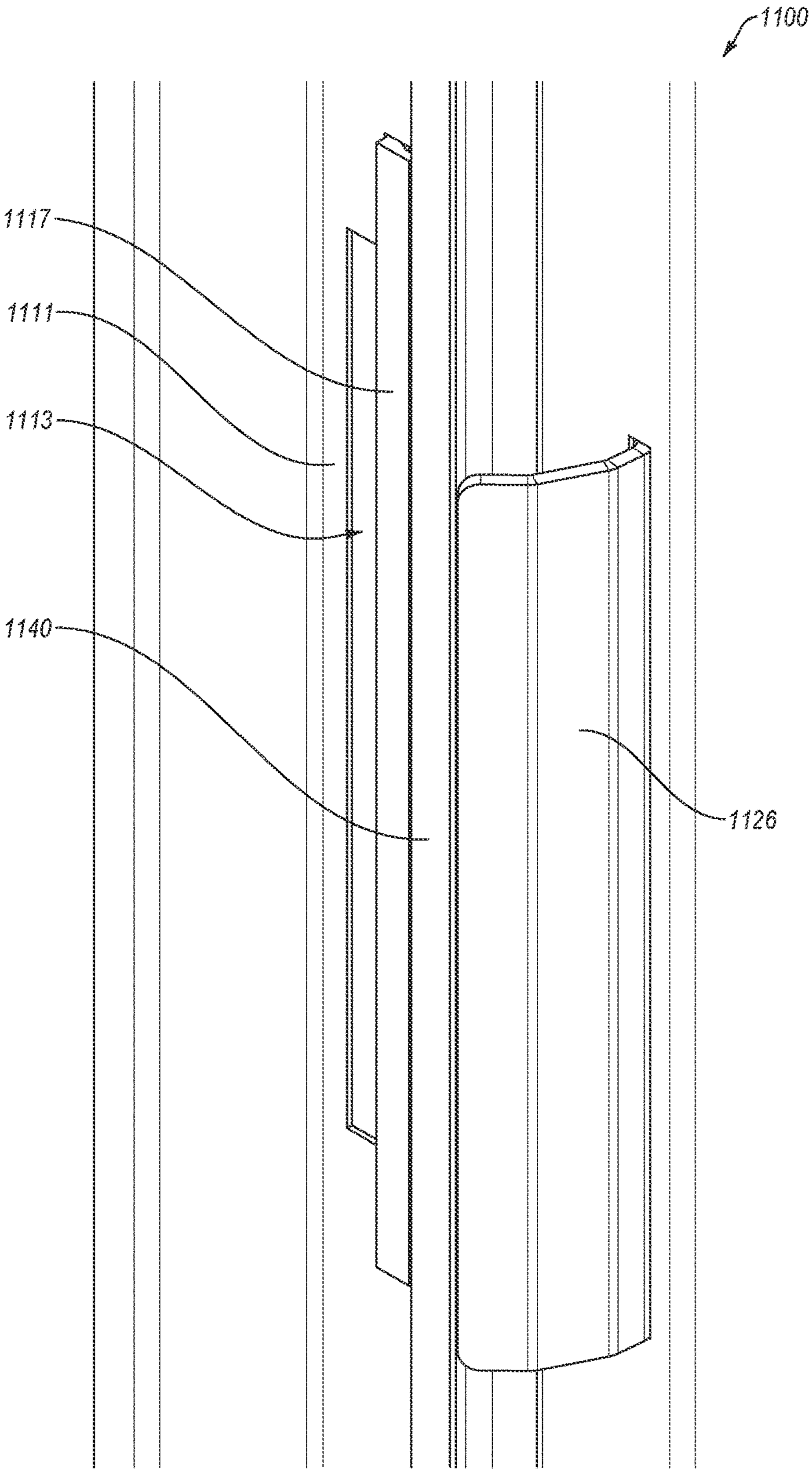
FIG. 21E is a close-up, perspective view of the locking flange and adjacent components of a safe or other enclosure, including a slot for receiving the locking flange.
Figure 22A:
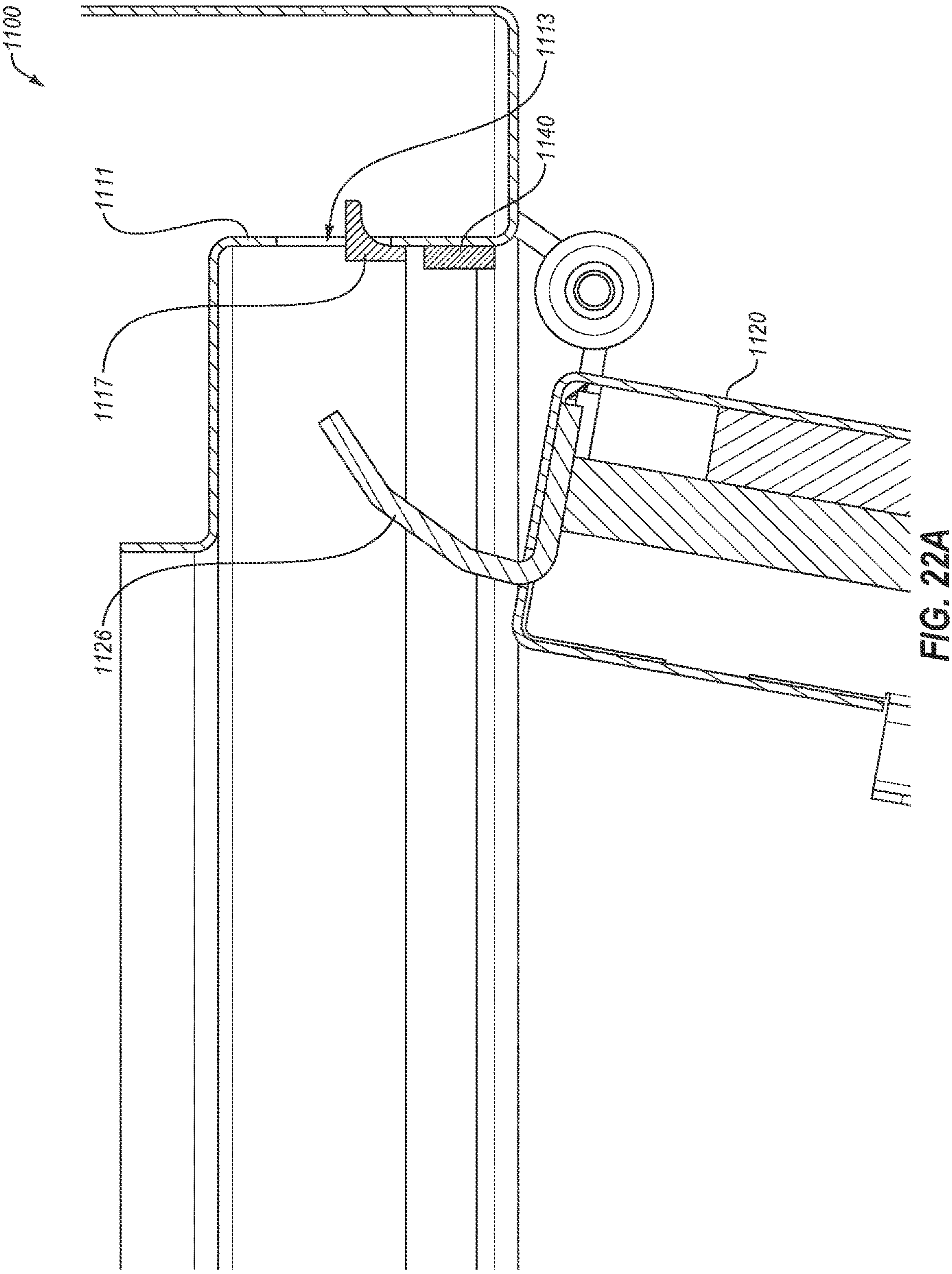
FIGS. 22A and 22B are cross-sectional views of the embodiment of FIGS. 21A-21D illustrating the locking flange and a novel configuration for a fire seal according to some embodiments.
Figure 22B:
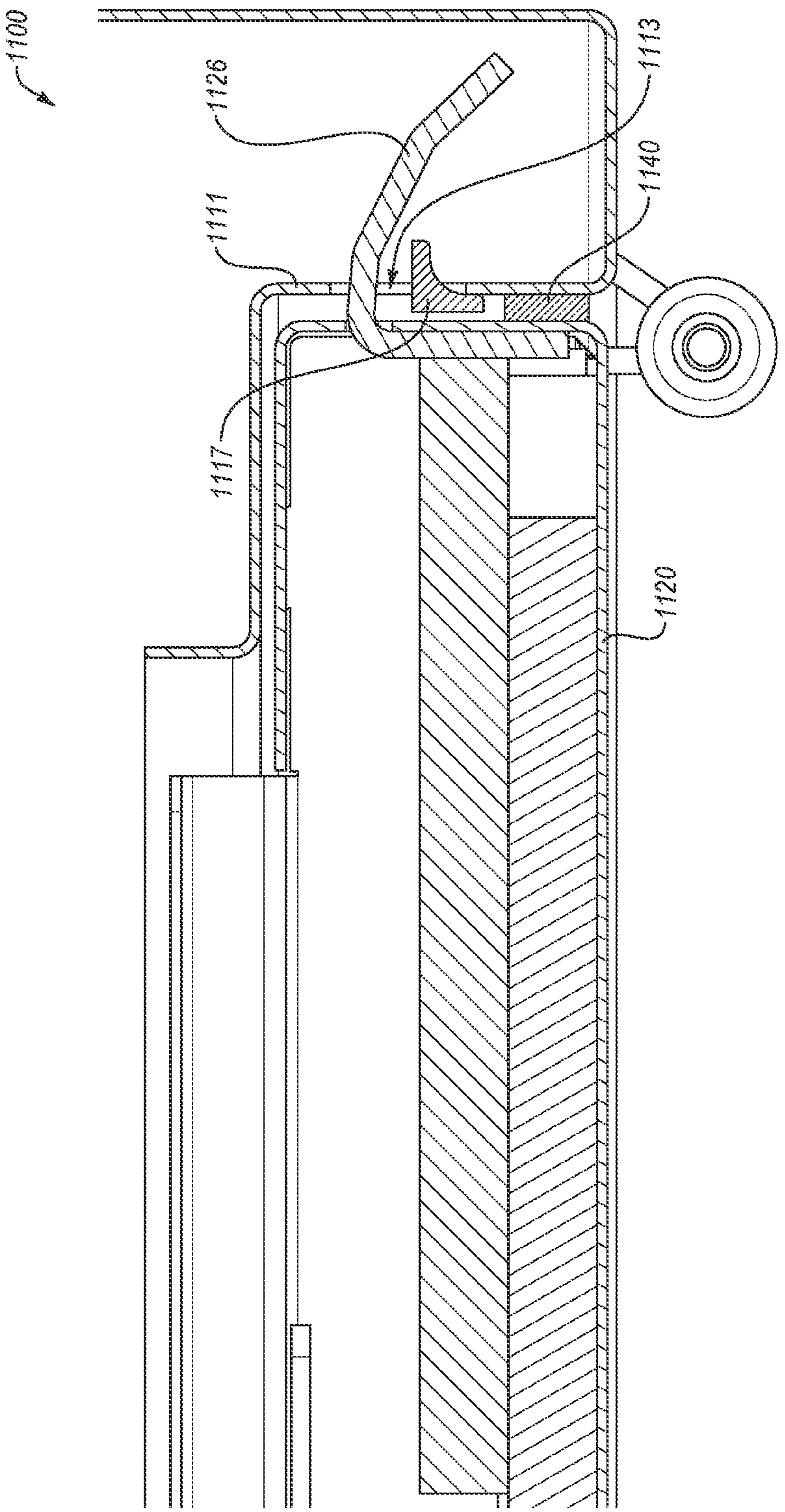

FIG. 21E depicts locking flange 1126 as it approaches an adjacent slot 1113 formed in the inset door frame 1111 during a closing action. As this figure and the subsequent cross-sectional views of FIGS. 22A and 22B show, the locking flange 1126, which is fixedly coupled with the door 1120, has a straight portion that is coupled to the frame of the door 1120 and then a curved portion configured to extend through an opening 1113 in an inner wall of the inset door frame 1111 when the door 1120 is closed. Both of these portions are configured to stiffen/strengthen the wall of the door frame in multiple axes. In addition, when the door is in a closed and locked configuration, the locking flange 1126 is configured to resist prying that may take place.

For example, as best shown in FIG. 22B, a prybar or other prying instrument that is inserted where fire seal 1140 is located (which is discussed below), will face several layers/features of resistance. Not only does the placement of the door 1120 within an inset frame 1111 place the primary prying forces against the frame 1111, which is in a direction orthogonal to the force direction that will result in opening of door 1120, but, due to the presence of locking flange 1126, the curved portion of locking flange 1126 will provide further resistance to prying by engaging/locking with adjacent features of the safe/enclosure.

The curved shape of locking flange 1126 allows the end/tip of the curved portion to extend further towards the front of the safe/enclosure than the slot 1113. Thus, in the event that a would-be thief were to successfully remove the hinges of the safe/enclosure and attempt to pry the door away from the frame, the door 1120 would be forced against the rear surface of the inset frame 1111, which resists this movement. In addition, the curved shape of the locking flange 1126 allows the length of the curved arc of the curved portion to be longer than the distance with which this portion extends through the slot 1113, which increases the engagement between the locking flange 1126 and the structure of the frame 1111 adjacent to the slot 1113, which may result in a deformation friction lock between the parts to provide further resistance to opening the door and/or accessing the contents of the safe/enclosure.

In the depicted embodiment, an angled stiffener 1117 is provided adjacent to locking flange 1126 in the closed configuration. As shown in FIG. 21E, angled stiffener 1117 may extend adjacent and immediately proximal/interior of slot 1113. Angled stiffener 1117 may provide still further protection to the contents of the safe/enclosure. For example, because stiffener 1117 is coupled to the frame 1111 adjacent to slot 1113, both legs of the stiffener 1117 may strengthen/stiffen the door frame wall and the proximal/forward edge of the slot 1113. This strengthening/stiffening occurs in multiple axes/directions, thereby substantially reducing deformation in these areas that may occur during a prying attack.

It should be understood that, although the stiffener 1117 in the depicted embodiment is angled, other embodiments are contemplated in which this shape may vary. For example, tubing or solid material having a circular or rectangular cross-section may be used in some embodiments, or a flattened plate-like stiffener. However, use of an angled stiffener 1117 as shown in the figures may be preferred for certain applications as this allows one leg of the stiffener 1117 to enter the hollow space of the door frame 1111, similar to locking flange 1126. This increases the engagement of the locking flange 1126 by providing another element to strengthen the surrounding areas and engage the locking flange 1126 in the event of a prying attack. This also increases the force necessary to achieve separation between the door 1120 and the door frame 1111, which provides further protection by increasing the difficulty and force required in order for a would-be thief to force the locking flange 1126 through the slot 1113.

Figure 22C:
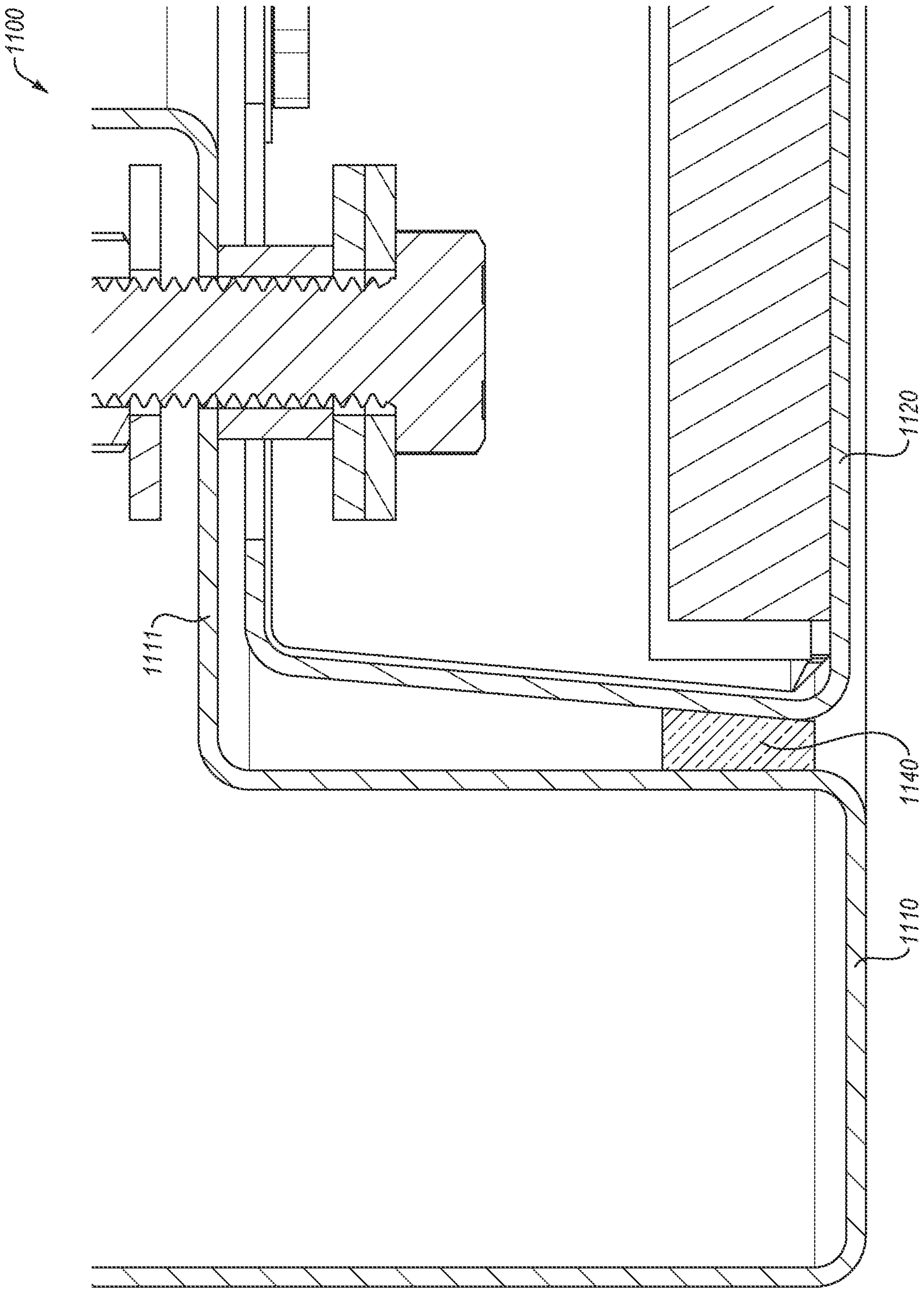
FIG. 22C is a cross-sectional view of the embodiment of FIGS. 21A-21D shown from the non-hinged side of the door.

As also shown in FIG. 21E, a fire seal 1140 may extend about the periphery of the door frame 1111 adjacent and preferably immediately proximally/interior of the stiffener 1117. One or more of the novel features presented herein allows for this placement of a fire seal at an advantageous location, particularly compared with the typical placement of a fire seal in most safes, which is on a rear surface of the door, leaving a substantial portion of the safe exposed to heat transfer. By placing the fire seal 1140 immediately adjacent to the outer surface of the door 1120, as shown in FIG. 22B and in FIG. 22C, which depicts the door 1120 from the non-hinged side, the fire seal 1140 can provide immediate protection to a fire or other source of heat from outside of the safe/enclosure. This may allow not only for slowing heat transfer and improving fire protection for the contents of the safe/enclosure but may also provide additional prying resistance. In particular, since this location for the fire seal is also the location where any prying attacks are likely to take place, this provides another barrier to insertion of a prying instrument therein and subsequent prying that may result in access to the contents of the safe/enclosure.

Figure 23A:
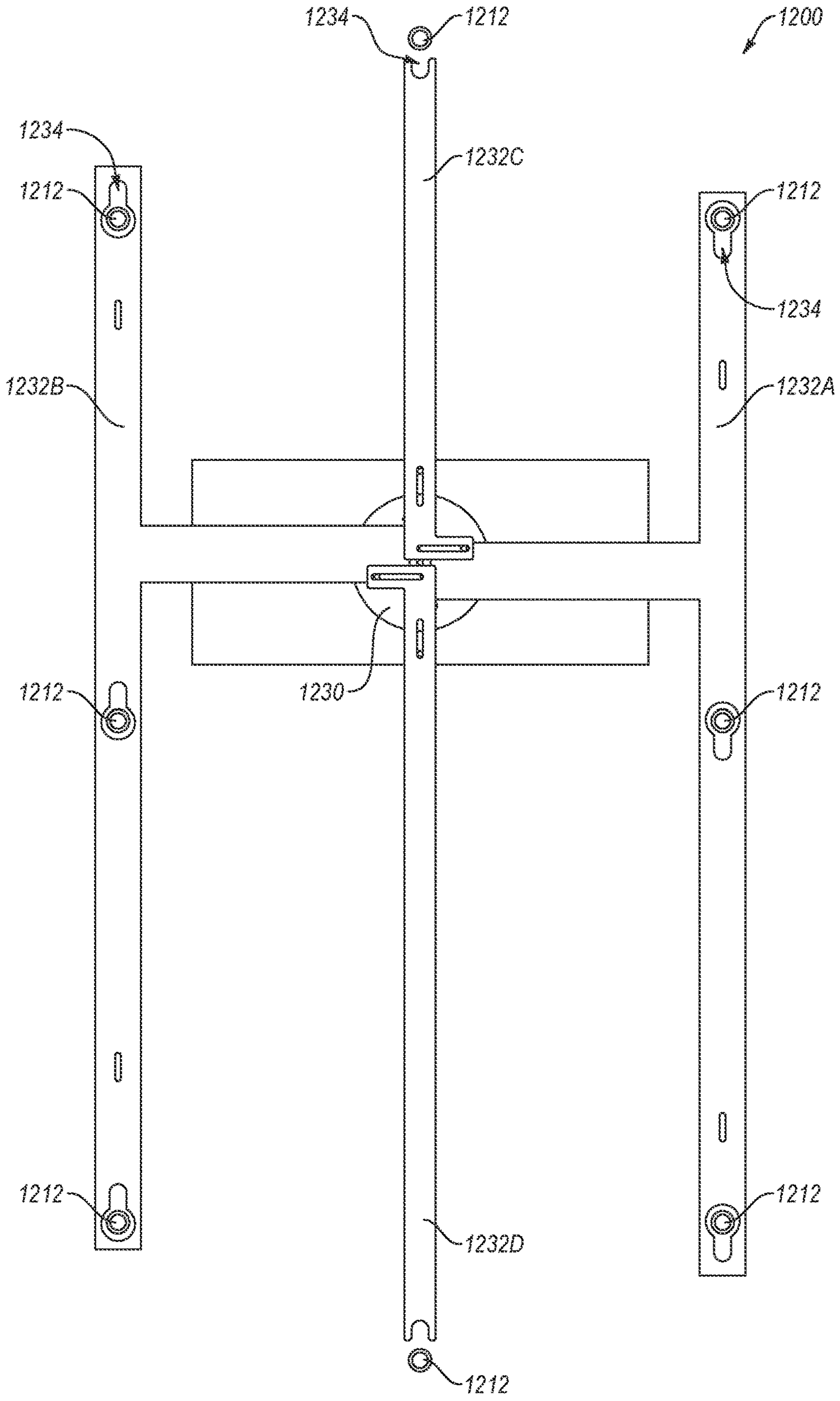
FIGS. 23A and 23B depict a further embodiment of a locking mechanism/assembly in which locking members are engaged by vertical movement of actuation members in two opposing horizontal and two opposing vertical directions.
Figure 23B:
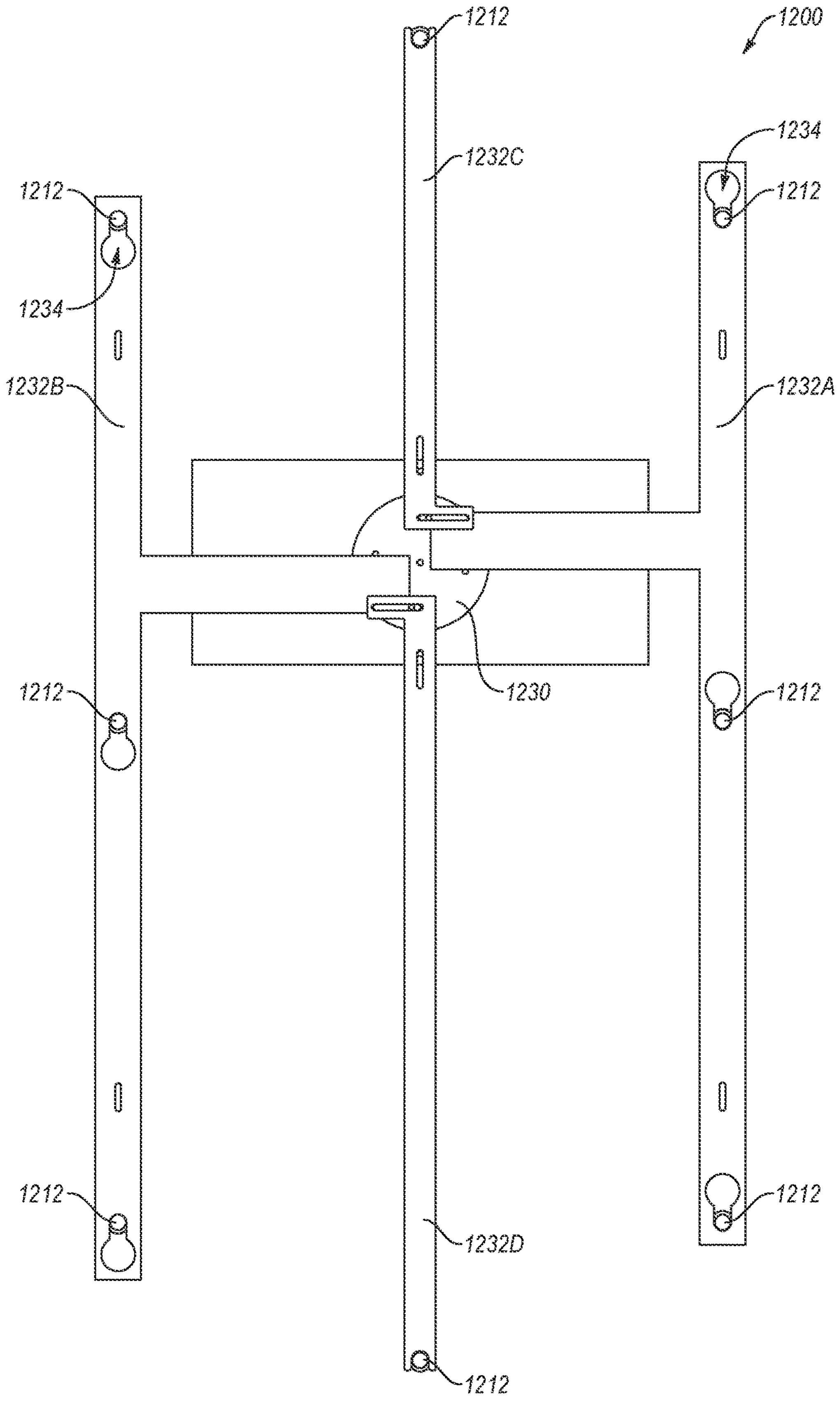

FIGS. 23A and 23B depict yet another embodiment of a locking mechanism/assembly 1200. FIG. 23A depicts this assembly 1200 in its unlocked configuration and FIG. 23B in its locked configuration. Although no door or lid is shown in these figures, it should be understood that, as discussed throughout this disclosure, the actuator/actuation plate 1230 and its associated actuation members 1232A-1232D would typically be incorporated into the door/lid, such as within a frame defining the door/lid, but the door/lid is not shown in these figures for the sake of simplicity and to avoid obscuring the features being disclosed in these figures.

Similarly, each of the locking members 1212, which, again, may comprise locking studs, bolts, or any other locking members preferably comprising an enlarged portion or adjacent, coupled, and enlarged component, such as a washer, is not shown coupled to anything in the figures, but it should be understood that these locking members 1212 would typically be fixedly mounted to an adjacent door frame or the like.

As can be seen in FIGS. 23A and 23B, the various actuators are configured to engage a plurality of slots 1234 with a respective locking member 1212. More particularly, there are two rows of vertically extending locking members 1212 on either side of the actuator/actuation plate 1230 and there are additional locking members 1212 above and below the actuator/actuation plate 1230. Again, additional locking members 1212 may be formed in rows along the top or bottom, if desired.

As previously mentioned, any of the slots 1234 may be open-ended or closed and having an enlarged portion to receive the enlarged head/portion/component of a corresponding locking member 1212. For example, in the embodiment of FIGS. 23A and 23B, the slots 1234 configured to engage the central locking members 1212 positioned above and below actuator 1230 are open-ended, whereas the remaining slots 1234 are each defined by an enlarged portion configured to allow a corresponding enlarged head or other enlarged portion of a locking member to pass thereby and a narrowed portion configured to engage the enlarged head or other enlarged portion to prevent the corresponding locking member from being disengaged from the corresponding actuation member 1232.

Rotation of the actuation plate 1230—which, as mentioned above, may be accomplished in any number of ways, including but not limited to rotation of a crank handle following a successful unlocking process—may simultaneously result in vertical movement of the two lateral actuation members 1232A and 1232B and vertical movement of the two vertical actuation members 1232C and 1232D. In this manner, a secure locking of an enclosure, such as a safe, box, building, vehicle, etc., may be accomplished by placement of locking studs or other locking members at any position about the periphery of the door/lid of the enclosure.

Throughout this specification, any reference to “one embodiment,” “an embodiment,” or “the embodiment” means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined only by the following claims.

The invention claimed is:

1. A safe, comprising:

a body;

a door coupled with the body;

at least one protruding locking member fixedly coupled with and protruding from a portion of the body positioned internally of an outer frame of the body;

at least one actuation member moveably coupled with the door, wherein the at least one actuation member comprises a slot, wherein the at least one actuation member is configured to, upon actuation with the door in a closed configuration, selectively engage the at least one protruding locking member, and lock the door in the closed configuration; and a recessed frame inset, at least in part, from an outer frame of the body to receive the door therein in the closed configuration, wherein the at least one protruding locking member is fixedly coupled with the recessed frame.

2. The safe of claim 1, wherein the at least one actuation member is configured to avoid extending beyond a perimeter of the door in a locked configuration.

3. The safe of claim 1, wherein the at least one protruding locking member is fixedly coupled with the recessed frame to at least substantially prevent prying forces from being generated in a direction towards movement of the door from the closed configuration to an open configuration.

4. The safe of claim 1, wherein the at least one protruding locking member comprising at least one locking stud.

5. The safe of claim 4, wherein the at least one locking stud comprises a plurality of locking studs.

6. The safe of claim 5, wherein the plurality of locking studs comprises a first set of locking studs extending along a first row extending between an upper portion of the body and a lower portion of the body.

7. The safe of claim 5, wherein the plurality of locking studs comprises a first set of locking studs extending along a first row extending between a first side of the body and a second side of the body opposite from the first side.

8. The safe of claim 5, wherein each of the plurality of locking studs comprises at least one of an enlarged head and a washer configured to provide an engagement surface for a respective slot to lock the door in the closed configuration.

9. A lockable structure, comprising:

a body;

a door coupled with the body and configured to enclose the body when the door is in a closed position, wherein the door comprises an outer periphery defined in between upper and lower portions of the door and opposing sides of the door;

at least one locking member coupled with the body;

an actuation member moveably coupled with the door; and at least one engagement member coupled with the actuation member, wherein, upon actuation of the actuation member with the door in the closed position, the at least one engagement member is configured to selectively engage the at least one locking member to prevent the door from being opened, wherein the at least one engagement member is configured to move between a first position and a second position during a locking actuation, wherein the second position is closer to the outer periphery of the door than the first position, and wherein at least a portion of the at least one engagement member that engages the at least one locking member is configured to avoid extending beyond a perimeter of the door.

10. The lockable structure of claim 9, wherein the at least one engagement member is configured to wholly avoid extending beyond the perimeter of the door.

11. The lockable structure of claim 9, wherein the lockable structure comprises a locking pistol box.

12. The lockable structure of claim 9, wherein the at least one locking member comprises a plurality of protruding studs, wherein the at least one engagement member comprises a plurality of engagement members corresponding with the plurality of protruding studs, wherein each of the plurality of protruding studs comprises an enlarged engagement surface configured to fixedly engage a corresponding engagement member following the locking actuation to lock the door in the closed position.

13. The lockable structure of claim 12, wherein each of the plurality of protruding studs protrudes from a recessed surface inset from an outermost edge of the body.

14. The lockable structure of claim 13, wherein each of the plurality of protruding studs extends in a direction at least substantially perpendicular to an outer surface of the door in the closed position.

15. The lockable structure of claim 9, wherein the actuation member comprises an elongated axis, and wherein the actuation member is configured to move towards the at least one locking member in a direction at least substantially perpendicular to the elongated axis of the actuation member during actuation.

16. A locking mechanism, comprising:

a door;

an actuator accessible from an outer surface of the door;

an actuation member coupled with the door and configured to translate towards a perimeter of the door in response to actuation of the actuator;

a protruding locking member fixedly mounted to a structure adjacent to the door; and an engagement member coupled with the actuation member, wherein the engagement member comprises an open-ended slot, wherein the engagement member is configured to selectively engage the protruding locking member upon actuation of the actuator with the door in a closed position to lock the door in the closed position.

17. The locking mechanism of claim 16, wherein the engagement member is configured to avoid extending beyond the perimeter of the door in a locked configuration.

18. A safe comprising the locking mechanism of claim 16.

19. The locking mechanism of claim 16, wherein the door comprises a house door, and wherein the structure comprises a door frame.

20. The locking mechanism of claim 16, further comprising a plurality of protruding locking members fixedly mounted to the structure.

21. The locking mechanism of claim 20, wherein the structure comprises a frame.

22. The locking mechanism of claim 21, wherein the frame is inset from an outer edge of an enclosure such that the door fits within the frame with the outer surface of the door either aligned with the outer edge of the frame or inset from the outer edge of the frame in the closed position.

23. The locking mechanism of claim 16, wherein the actuation member comprises an elongated axis, and wherein the open-ended slot comprises an open end angled away from the elongated axis of the actuation member.

24. The locking mechanism of claim 23, wherein the actuation member is configured to move the open end of the open-ended slot towards the protruding locking member in a direction at least substantially perpendicular to a direction of the elongated axis of the actuation member.

* * * * *